US011597183B2

(12) United States Patent
Free et al.

(10) Patent No.: US 11,597,183 B2
(45) Date of Patent: Mar. 7, 2023

(54) PROFILED FILMS

(71) Applicant: 3M INNOVATIVE PROPERTIES COMPANY, St. Paul, MN (US)

(72) Inventors: Michael Benton Free, Stillwater, MN (US); Stephen A. Johnson, Woodbury, MN (US); William T. Fay, Woodbury, MN (US); Troy J. Anderson, Afton, MN (US); Derek W. Patzman, Savage, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 162 days.

(21) Appl. No.: 16/608,407

(22) PCT Filed: May 2, 2018

(86) PCT No.: PCT/IB2018/053055
§ 371 (c)(1),
(2) Date: Oct. 25, 2019

(87) PCT Pub. No.: WO2018/203260
PCT Pub. Date: Nov. 8, 2018

(65) Prior Publication Data
US 2020/0189164 A1    Jun. 18, 2020

Related U.S. Application Data

(60) Provisional application No. 62/502,360, filed on May 5, 2017.

(51) Int. Cl.
*B32B 3/26* (2006.01)
*B32B 7/06* (2019.01)
(Continued)

(52) U.S. Cl.
CPC ............. *B32B 7/06* (2013.01); *B29C 48/12* (2019.02); *B29C 48/21* (2019.02); *B32B 3/263* (2013.01);
(Continued)

(58) Field of Classification Search
CPC ..... Y10T 428/24521; Y10T 428/24529; Y10T 428/24537; Y10T 428/2457;
(Continued)

(56) References Cited

U.S. PATENT DOCUMENTS 3,930,102 A   12/1975   Mueller et al.
4,599,265 A   7/1986   Esmay
(Continued)

FOREIGN PATENT DOCUMENTS

CN   103627277   1/2015
EP   2851406   3/2015
(Continued)

OTHER PUBLICATIONS

Supplementary Search Report for EP Appl. No. 18795153.8, dated Nov. 12, 2020, 2 pp.
(Continued)

*Primary Examiner* — Z. Jim Yang
(74) *Attorney, Agent, or Firm* — Gregg H. Rosenblatt

(57) ABSTRACT

The present disclosure relates to films having at least a first profiled layer and a second layer having an inverse profile of the first layer. Those films can be used as protection tapes for various surfaces. Exemplary uses of the films of the present disclosure include leading edge protection tapes for rotor blades.

9 Claims, 8 Drawing Sheets

(51) Int. Cl.
*B29C 48/21* (2019.01)
*B32B 27/40* (2006.01)
*B32B 27/32* (2006.01)
*B29C 48/12* (2019.01)
*B29C 48/30* (2019.01)
*B29K 23/00* (2006.01)
*B29L 7/00* (2006.01)
*B32B 27/08* (2006.01)
*B32B 27/36* (2006.01)
*F03D 1/06* (2006.01)

(52) U.S. Cl.
CPC .............. *B32B 27/32* (2013.01); *B32B 27/40* (2013.01); *B29C 48/30* (2019.02); *B29K 2023/0625* (2013.01); *B29K 2023/12* (2013.01); *B29L 2007/008* (2013.01); *B32B 27/08* (2013.01); *B32B 27/36* (2013.01); *B32B 2307/538* (2013.01); *F03D 1/0675* (2013.01); *Y10T 428/24521* (2015.01)

(58) Field of Classification Search
CPC ..... Y10T 428/24587; Y10T 428/24612; B32B 3/26; B32B 3/263; B32B 3/30; B64C 21/10; B64C 23/00; B64C 23/005; B64C 27/467; B64C 27/615; B64C 2230/08; B64C 2230/26; B64C 2230/28; F15D 1/002–0045; F15D 1/12; Y02T 50/10; Y02T 50/30; C09J 7/201–203; C09J 7/40–405
See application file for complete search history.

(56) References Cited

U.S. PATENT DOCUMENTS

| | | |
|---|---|---|
| 4,693,776 A | 9/1987 | Krampe et al. |
| 4,731,911 A | 3/1988 | Gould |
| 4,921,882 A * | 5/1990 | Senich .................... C08L 83/04 522/99 |
| 4,925,671 A | 5/1990 | Abber |
| 5,116,676 A | 5/1992 | Winslow |
| 5,316,846 A | 5/1994 | Pinsky et al. |
| 5,851,664 A | 12/1998 | Bennett et al. |
| 6,045,922 A | 4/2000 | Janssen et al. |
| 6,048,431 A | 4/2000 | Clements et al. |
| 8,088,480 B2 | 1/2012 | Goecke |
| 8,883,290 B2 | 11/2014 | Lowe |
| 9,440,737 B1 * | 9/2016 | Cawthorne ........... B64C 27/615 |
| 2003/0096109 A1 | 5/2003 | Yanagiuchi |
| 2004/0265540 A1 * | 12/2004 | Balakoff ................... B32B 7/06 428/156 |
| 2005/0003146 A1 * | 1/2005 | Spath ..................... F15D 1/0035 428/105 |
| 2006/0228092 A1 * | 10/2006 | Hebrink ............... G02B 5/0268 385/147 |
| 2010/0196664 A1 * | 8/2010 | Kuiper ...................... C09J 7/40 428/156 |
| 2011/0262705 A1 * | 10/2011 | Gupta ..................... F15D 1/004 428/156 |
| 2012/0263906 A1 | 10/2012 | Ausen et al. |
| 2014/0154089 A1 * | 6/2014 | Traser ..................... B32B 37/24 156/60 |
| 2014/0272237 A1 * | 9/2014 | Roper ................... F15D 1/0035 428/419 |
| 2015/0043840 A1 | 2/2015 | Bois et al. |
| 2015/0258755 A1 | 9/2015 | Kauschke |
| 2015/0292522 A1 * | 10/2015 | Singh .................... F03D 1/0683 416/228 |
| 2016/0010670 A1 * | 1/2016 | Schuetze ................ B64C 21/10 428/156 |
| 2016/0325823 A1 * | 11/2016 | Rawlings ................ G09F 21/08 |
| 2018/0009136 A1 * | 1/2018 | Rawlings ............... B32B 15/06 |
| 2019/0047684 A1 * | 2/2019 | Linde ..................... B64C 21/10 |
| 2022/0033068 A1 * | 2/2022 | Mikami ................... B29D 7/01 |

FOREIGN PATENT DOCUMENTS

| | | |
|---|---|---|
| WO | WO 1998-029516 | 7/1998 |
| WO | WO 1999-050902 | 10/1999 |
| WO | WO 2007-079913 | 7/2007 |
| WO | WO 2014-200812 | 12/2014 |
| WO | WO-2018034177 A1 * | 2/2018 ............... B05D 1/28 |

OTHER PUBLICATIONS

Moore, "Gel Permeation Chromatography. I. A New Method for Molecular Weight Distribution of High Polymers," Journal of Polymer Science: Part A, Feb. 1964, vol. 2, No. 2, pp. 835-843.

International Search Report for PCT International Application No. PCT/IB2018/053055, dated Aug. 23, 2018, 3 pages.

* cited by examiner

PROFILED FILMS

The present disclosure relates to films having at least a first profiled layer and a second layer having an inverse profile of the first layer. Those films can be used as protection tapes for various surfaces. Exemplary uses of the films of the present disclosure include leading edge protection tapes for rotor blades.

BACKGROUND

Rotor blades, such as those in helicopters, wind turbines, and the like, are subject to varied environmental conditions, including erosion caused by the impact of airborne material, such as rain, sand, dust, and other debris. The leading edge of a rotor blade is particularly prone to damage by erosion. Examples of other articles used outdoors subject to similar erosion include certain portions of the fuselage or a wing of an aircraft.

The industry has sought ways of protecting against such erosion by means of films and coatings, among others. The application of those solutions on rotor blades, for instance, cannot be easily automated and is typically done by hand. In general, the application process can be time-consuming, especially when applying tapes or coatings to blades of large dimensions, as may be the case for wind turbines, whose blades may have a length greater than 30 m, or even greater than 60 m. The next generation of wind rotor blades are expected to have lengths of more than 100 m.

The use of protective coatings, in particular, has various potential disadvantages over the use of tapes, including non-uniform thickness, long curing times, uneven curing, and intense manual labor, among others. Additionally, in general, coatings are more susceptible to adverse environmental conditions during application. In operations and maintenance situations, where turbine blades have to be repaired in the field, repairs using coatings may need to wait until weather conditions are suitable or the repair may need to be done outside of the application window, which would result in poor material performance.

Typically, in the case of the films, the film is applied around the leading edge of the rotor blade and adhered to the blade by an adhesive. The outermost surface of commercial tapes is usually planar and, in its most basic configuration, comprises a polymer film as protective layer and an adhesive layer for attachment to the rotor blade.

Typical tapes for rotor blades have a rectangular profile. The inventors are aware that the edges of typical films, after they have been applied on the rotor blade, can be detrimental to the aerodynamic flow around the blade. The present disclosure relates to films that provide solutions to problems identified by the inventors with typical tapes known in the art.

SUMMARY

The inventors have observed that protective tapes having a cross-sectional rectangular profile create a turbulent disruption in the smooth flow of wind over the rotor blade, which increases the amount of power needed to rotate the blade and reduces efficiency. In one preferred embodiment of this disclosure, in order to minimize the turbulence at the edges of the film, the inventors have created a tapered film that is thinner at the edges (in a cross-section profile) and thicker in the inner region. In general, those tapered films minimize the step height off the edge of the film, but keep the thickness and durability at the center of the film.

As applied, the thicker part of the film is aligned with the leading edge of the wind blade, providing the most protection where it is needed. The thickness tapers off towards the edges of the film, to minimize the detrimental aerodynamic effects. This approach seems to solve many of the issues with the use of standard tapes.

The inventors have observed, however, that there are significant problems with tapered tapes described above. For example, winding, steering, and transporting a film with tapered edges is difficult. Because of the profiled portion, it is difficult to keep every turn of the film in a roll laying lay flat.

Moreover, those protection films may require additional manufacturing processes after the formation of the film, such as coating or laminating Those additional steps are problematic when the film is not flat. For instance, coating adhesive on a tapered film can cause large caliper variations in the adhesive thickness, which can detrimentally affect the performance of the film. The lamination pressure is applied non-uniformly to the film and varies from high values in the thick areas to low values or zero in the thin areas, causing uneven application of laminates.

Finally, once the film has be unwound from the roll prior to its application, the thinner edges are exposed and can be easily damaged. Application of the film can also be problematic as the thin edges can be difficult to apply smoothly due to their lack of integrity.

The present inventors have found solutions to the problems outlined above. In some embodiments, the profiled film is coextruded with an inversely profiled layer so that the result is a flat film. Creating a flat film out of a profiled film addresses the disadvantages mentioned previously, including ease of winding the film, coating, lamination, and other downstream process steps, as well as protection and ease of application of the thin and delicate tapered edges.

In certain embodiments, the present disclosure is directed to coextruded films comprising:

a layer A having a first major surface and a second major surface opposite the first major surface;
  wherein the cross-section profile of the first major surface of the layer A is substantially flat and the cross-section profile of the second major surface of the layer A is non-flat, a layer B having a first major surface and a second major surface opposite the first major surface;
  wherein the first major surface of the layer B is immediately adjacent to the second major surface of the layer A,
  wherein the cross-section profile of the second major surface of the layer B is substantially flat,
  wherein the cross-section profile of the first major surface of the layer B is the inverse of the cross-section profile of the second major surface of the layer A, and wherein the coextruded film has a releasable interface between the layer A and the layer B.

In other embodiments, the films comprise an optional adhesive layer adjacent (or immediately adjacent) to the first major surface of the layer A, along with a corresponding optional liner. This optional adhesive layer may also be adjacent (or immediately adjacent) the first major surface of the layer B. In some embodiments, the adhesive layer and liner may be coextruded with layers A and B, or they may be laminated to the coextruded stack formed by layers A and B. Yet in other embodiments, the adhesive layer may be coated onto the coextruded stack formed by layers A and B and a suitable liner may be applied (either coated onto adhesive layer or laminated therein) afterwards to protect the adhesive layer.

In certain embodiments, layer B acts as a liner to layer A, wherein layer B not only protects the layer A during subsequent handling, but it also allows the film to have a relatively flat surface for ease of additional processing, transport, and application of the film.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend. Polymers referred to in this disclosure include those polymerized in-situ from monomers as well as those materials that exist in a polymeric form independent of the processes used to create them herein.

The term "adjacent" refers to the relative position of two elements, such as, for example, two layers, that are close to each other and may or may not be necessarily in contact with each other or that may have one or more layers separating the two elements as understood by the context in which "adjacent" appears.

The term "immediately adjacent" refers to the relative position of two elements, such as, for example, two layers, that are next to each other and in contact with each other and have no intermediate layers separating the two elements. The term "immediately adjacent," however, encompasses situations where one or both elements (e.g., layers) have been treated with a primer, or whose surface has been modified to affect the properties thereof, such as etching, embossing, etc., or has been modified by surface treatments, such as corona or plasma treatment, etc. that may improve adhesion.

The term "adhesive" as used herein refers to polymeric compositions useful to adhere together two components (adherents). Non-limiting examples of adhesives include heat activated adhesives, radiation-curable adhesives, pressure sensitive adhesives, and combinations thereof.

The term "construction" or "assembly" are used interchangeably in this application when referring to a multilayer film, in which the different layers can be coextruded, laminated, coated one over another, or any combination thereof.

The term "film" as used herein refers, depending on the context, to either a single layer article or to a multilayer construction, where the different layers may have been laminated, extruded, coated one over another, or any combination thereof. Throughout this application, the inventors may refer generically to the films of the present disclosure as "tapes" because a tape is one of the applications of the films of the present disclosure. However, reference to a "tape" in that context should not be construed as a requiring any features in addition to those of a film.

The term "cross-section" as used herein in the context of a film refers to the planar surface that would be exposed when making a straight cut in the width direction of the film.

The term "longitudinal cross-section" as used herein in the context of a film refers to the planar surface that would be exposed when making a straight cut in the length direction of the film.

The term "profile" as used herein in the context of a cross-section refers to the shape of the outline along the perimeter of the surface of the cross-section being analyzed. However, the term "profiled" layer, film, tape, cross-section, etc., refers to an article (e.g, layer, film, tape, or cross-section) that has a non-flat profile.

The term "substantially flat" as used herein in the context of a profile for a given layer or stack of layers refers to a profile that varies by no more than 10 percent in either direction from the average thickness of the layer or stack of layers over the length (W) of the profile, wherein the average thickness represents a true flat profile (e.g., a straight horizontal line). In the case of a cross-section profile of a film, for example, the length (W) of the profile corresponds to the width of the film.

The term "non-flat" as used herein in the context of a profile refers to a profile that is not substantially flat.

The term "inverse profile" of a profile A for a given surface as used herein refers to the profile of a surface B that, when aligned with the profile A, the absolute difference in distance at every point along the profile A between the profile A and the inverse profile is less than or equal to 1 percent of the maximum thickness of the profile A over the length of the profile A. Throughout this disclosure, a layer having an inverse profile will be called an inverse layer.

The term "no global minima" as used herein in the context of the thickness of a given portion of a profile refers to the absence of a minimum value for the thickness that has a value lower than the smallest thickness for the portion being analyzed.

The term "number average molecular weight" as used herein in the context of a polymer refers to the ordinary arithmetic mean or average of the molecular masses of the individual macromolecules. It is determined by measuring the molecular mass of n polymer molecules as determined by Gel Permeation Chromatography as per Moore, J. C., "Gel permeation chromatography. I. A new method for molecular weight distribution of high polymers," *J. Polym. Sci.*, 2:835-843 (1964), summing the masses, and dividing by n.

The term "shaped profile" as used herein refers to a profile that is not substantially flat and one or more portions of the profile have a shape chosen from: curved, trapezoidal, ramped, sinusoidal, and combinations thereof.

The term "curved" as used herein in the context of a portion of a profile refers to shape that is fully or partially either concave or convex.

The term "trapezoidal" as used herein in the context of a portion of a profile refers to shape having four sides, two parallel sides, one larger than the other, and two non-parallel sides.

The term "regular pattern" as used herein in the context of an interface between two surfaces refers to surface features on the interface that repeat themselves periodically along the longitudinal dimension of the interface.

The term "stochastic pattern" as used herein in the context of an interface between two surfaces refers to surface features on the interface that do not repeat themselves periodically along the longitudinal dimension of the interface.

Figure 1:
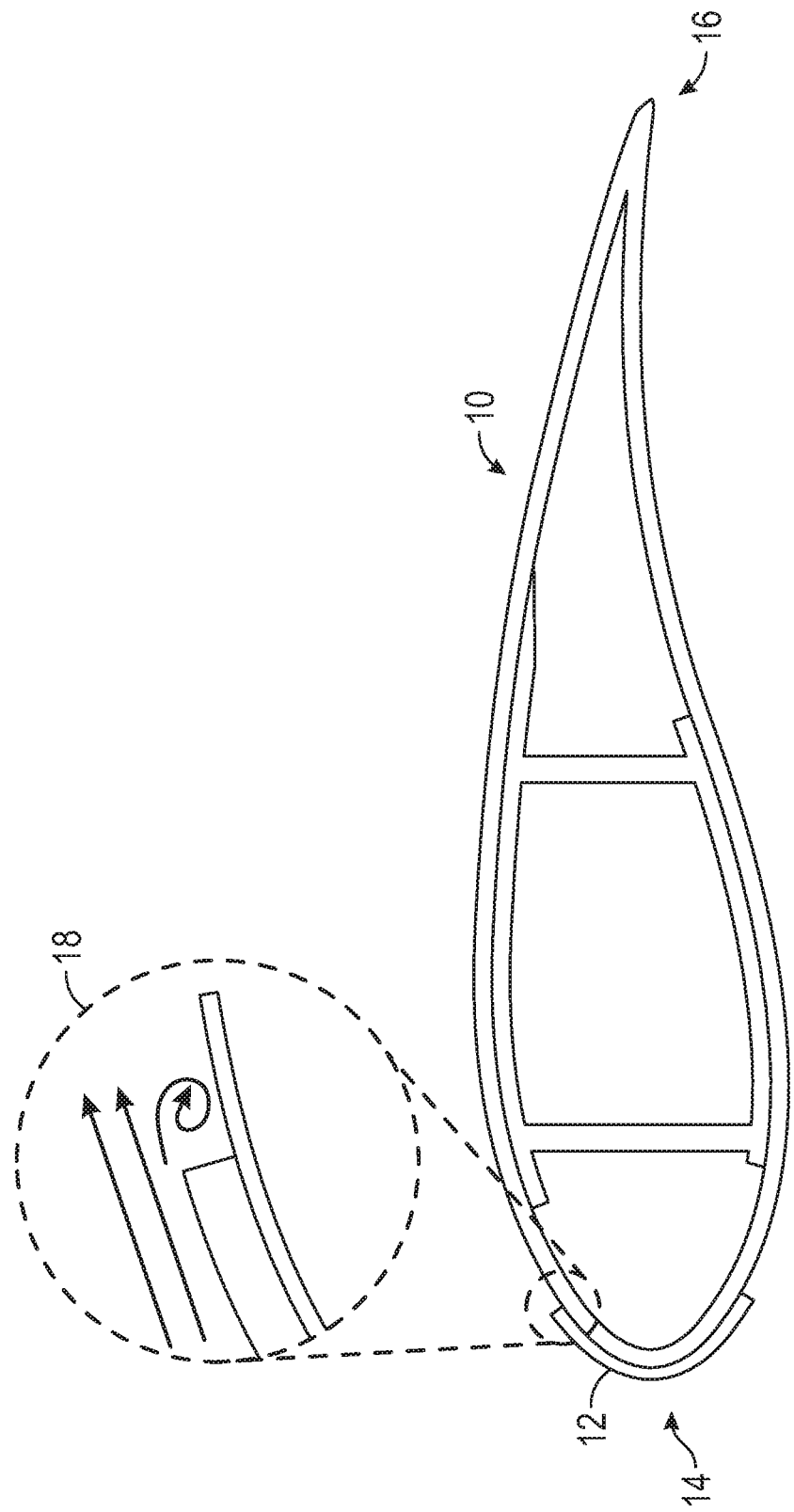
FIG. 1 shows tape 12 of the prior art on leading edge 14 of rotor blade 10. Area of flow disruption 18 is highlighted. Rotor blade 10 also has trailing edge 16.

In the following description, reference is made to the accompanying Figures herein described. In certain cases, the Figures may depict, by way of illustration, several specific embodiments of the present disclosure. It is to be understood that other embodiments different from those explicitly depicted in the Figures are contemplated and may be made without departing from the scope or spirit of the present disclosure. The following detailed description, therefore, is not to be taken in a limiting sense.

DETAILED DESCRIPTION

For convenience, the present disclosure is exemplified by referring to films useful for protecting blades from wind turbines. However, the concepts and subject matter taught, described, and claimed in this application extends to other uses of the films of the present disclosure, such as protection of helicopter blades, airplane wings, airplane fuselages, automobile parts, and other substrates susceptible to protection by the type of films described below.

In general, the present disclosure relates to films having at least a first profiled layer and a second layer having an inverse profile of the first layer. Those films may be prepared by coextruding the resins through a die with suitable dimensions to define thickness and width of both the profiled layer and the inverse layer. Throughout this disclosure, a stack prepared by coextruding at least a profiled layer and its corresponding inverse layer will be called a "coextruded stack." In certain embodiments, the coextruded stack also contains other coextruded layers, such as an adhesive layer and a corresponding release liner layer to protect the adhesive layer. The adhesive layer can be applied to either the profiled layer or the inverse layer. In some preferred embodiments, the adhesive layer is adjacent (or immediately adjacent) to the profiled layer. In other embodiments, however, the additional adhesive and liner layers may be laminated onto the coextruded stack. In other embodiments, the adhesive layer may be coated onto the coextruded stack and the liner layer may be laminated afterwards.

In certain preferred embodiments, the interface between the profiled layer and the inverse layer is releasable, so that both layers can be separated from each other. One of the goals of the present disclosure is to provide a protective film that is relatively flat so that it can be rolled, processed, transported, and handled with ease, but that, when needed, also contains a profiled surface with varying thickness. That goal is accomplished by having a flat film with a releasable interface so that one of the layers (e.g., the inverse layer) is removed exposing the profiled layer. In the case of protection films for the leading edge of rotor blades, a tape with a profiled surface provides the needed protection to the leading edge of the blade, while minimizing turbulence disruptions at the edges of the film where the film thickness tapers off.

In other embodiments, however, the interface between the profiled layer and the inverse layer is not releasable.

Coextruded Film

In certain embodiments, the present disclosure is directed to coextruded films comprising:
  a layer A having a first major surface and a second major surface opposite the first major surface;
    wherein the cross-section profile of the first major surface of the layer A is substantially flat and the cross-section profile of the second major surface of the layer A is non-flat,
  a layer B having a first major surface and a second major surface opposite the first major surface;
    wherein the first major surface of the layer B is immediately adjacent to the second major surface of the layer A,
    wherein the cross-section profile of the second major surface of the layer B is substantially flat,
    wherein the cross-section profile of the first major surface of the layer B is the inverse of the cross-section profile of the second major surface of the layer A, and
  wherein the coextruded film has a releasable interface between the layer A and the layer B.

In other embodiments, the present disclosure is directed to coextruded films comprising:

A film comprising a coextruded stack, wherein the coextruded stack comprises:
- a layer A having a first major surface and a second major surface opposite the first major surface;
  - wherein the cross-section profile of the first major surface of the layer A is substantially flat and the cross-section profile of the second major surface of the layer A is non-flat,
- a layer B having a first major surface and a second major surface opposite the first major surface;
  - wherein the first major surface of the layer B is immediately adjacent to the second major surface of the layer A,
  - wherein the cross-section profile of the second major surface of the layer B is substantially flat,
  - wherein the cross-section profile of the first major surface of the layer B is the inverse of the cross-section profile of the second major surface of the layer A,
- wherein the film further comprises:
  - an adhesive layer adjacent the first major surface of the layer A, and
  - a liner adjacent the adhesive layer opposite the first major surface of the layer A, and
- wherein the coextruded stack has a releasable interface between the layer A and the layer B.

Figure 2:
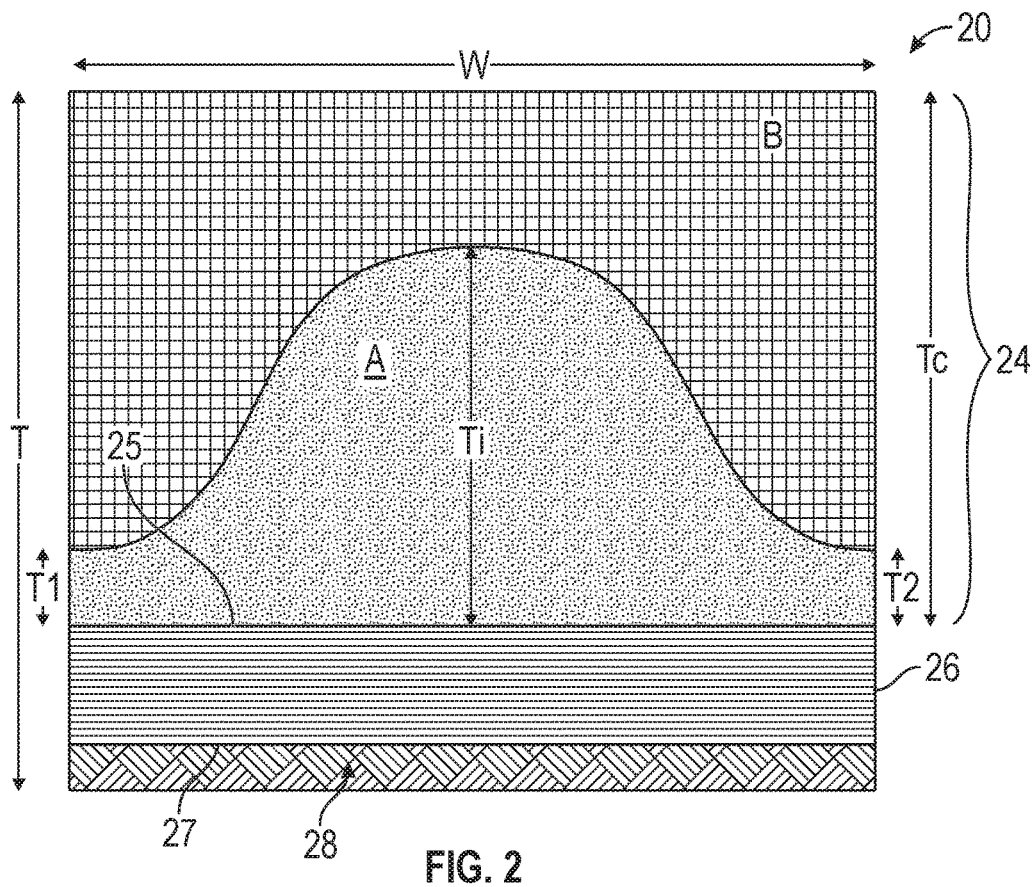
FIG. 2 shows a cross section of an embodiment of the films of the present disclosure.

A perspective view of exemplary film 20 according to the present disclosure is illustrated in FIG. 2, which shows a diagram of the cross-section of the film. In general, film 20 has a length (L), a width (W) and a thickness (T). The length of film 20 is its longest dimension followed by its width, wherein the length of the film is always greater than its width. The width of film 20 is always greater than its thickness. In FIG. 2, the thickness of film 20 when the optional adhesive layer 26 and optional liner layer 28 are not present is Tc. When adhesive layer 26 and liner layer 28 are present, the thickness of film 20 is T. Typically, film 20 has a width of at least 50 mm. In some embodiments, film 20 has a width from 12 mm to 1500 mm. Typically, film 20 has a length of at least 2.5 meters.

As can be seen in FIG. 2, layer A has a profiled cross-section. The surface of the layer A in FIG. 2 has a cross-sectional profile such that the layer, across its width, has an inner portion between two edge lateral sections, wherein the maximum thickness of the inner portion has a thickness (Ti) and the edge lateral sections have a thickness T1 and T2. The thickness Ti is greater than the thickness of each of the edge lateral sections (T1, T2) of layer A. The surface of the layer A is shaped to provide the cross-sectional profile described above.

Figure 3:
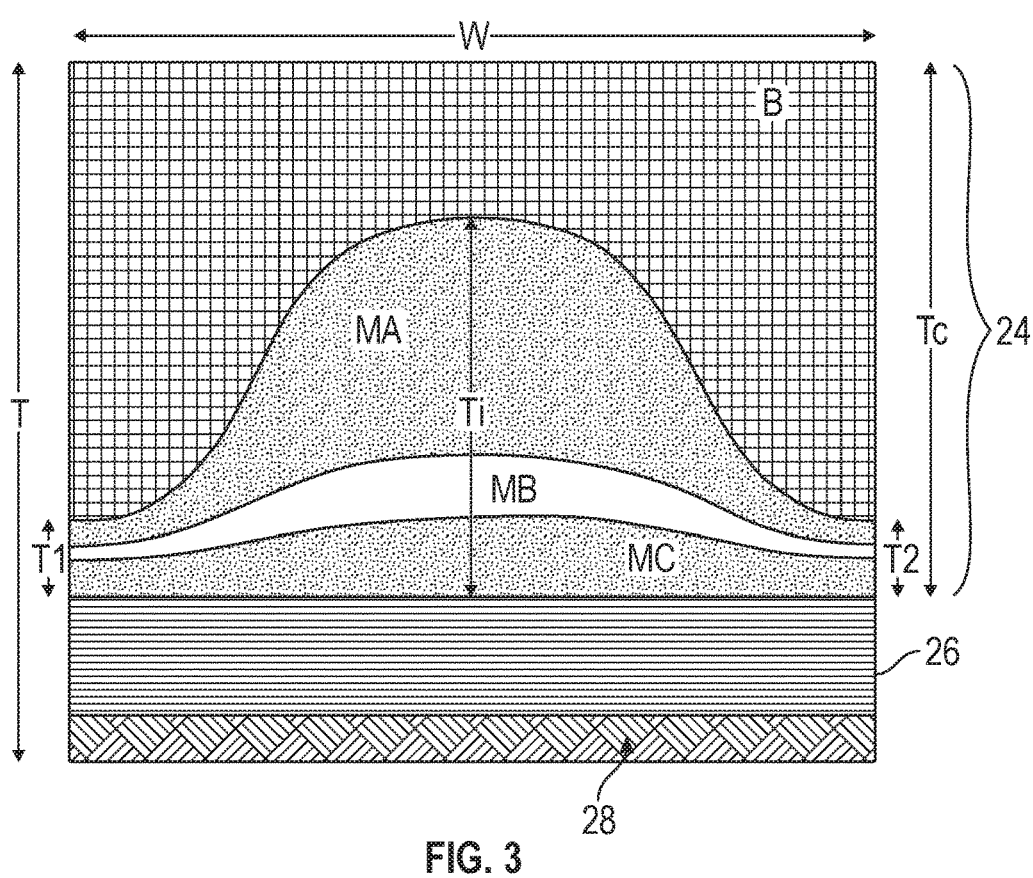
FIG. 3 shows a cross section of an embodiment of the films of the present disclosure, wherein layer A is made of three different materials.
Figure 4A:
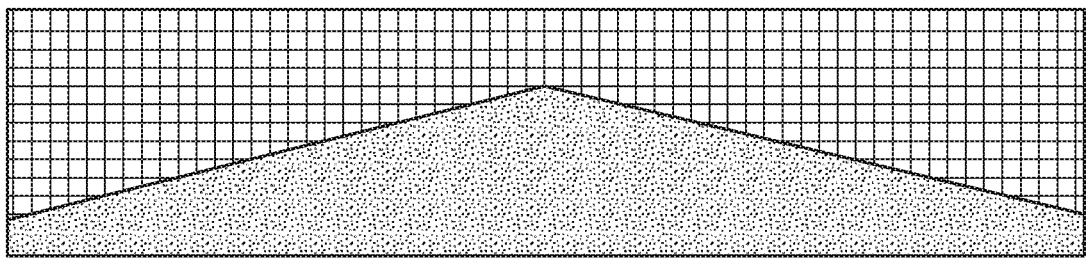
FIGS. 4(a)-4(d) show cross sections of embodiments of the films of the present disclosure, wherein the surface of layer A has various shapes.
Figure 4B:
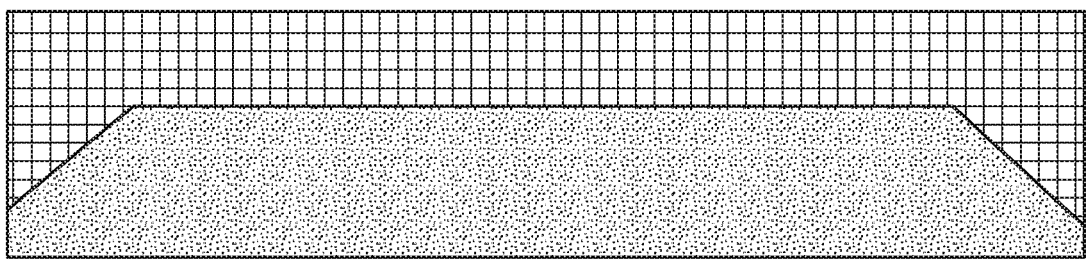
Figure 4C:
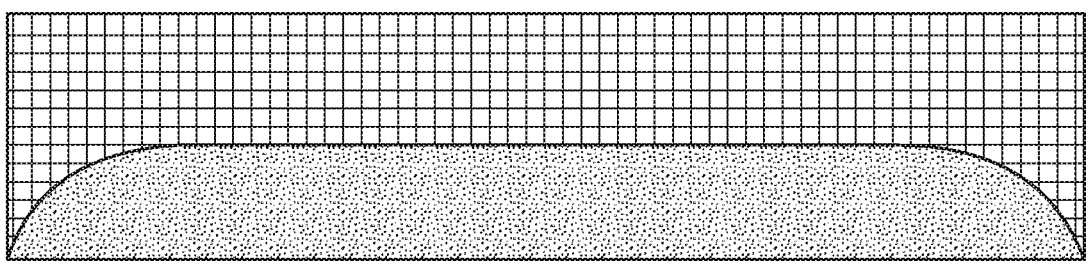
Figure 4D:
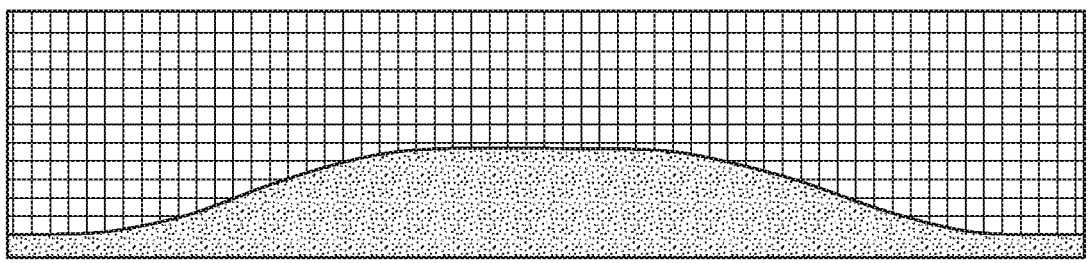

In some embodiments, the surface of layer A may be outwardly curved, for example to describe a convex shape (as represented in FIGS. 2 and 3). In other embodiments, the surface may be angled to describe a trapezoidal shape (as shown in FIG. 4(b). Therefore, in some embodiments, layer A has a thickness at its inner section that is greater than the thickness at its lateral sections or its edges.

In other embodiments, at least a portion of the profile of layer A may include a portion of a concave shape. In certain embodiments, the profile of the layer A includes combinations of different shapes, such as linear portions, curved portions (convex and concave), trapezoidal portions, ramped portions, sinusoidal portions, etc.

FIG. 2 shows an example of the layered-construction of a film of the present disclosure. In this embodiment, film 20 comprises a layer A, a layer B, optional adhesive layer 26, and optional release liner 28 to protect the adhesive layer. In some embodiments, adhesive layer 26 is present and contains an adhesive for attachment to a substrate, such as a rotor blade. Adhesive layer 26 can be applied to either layer A or layer B (the inverse layer). In some preferred embodiments, adhesive layer 26 is adjacent (or immediately adjacent) to layer A.

In certain embodiments, adhesive layer 26 and layer A (or layer B as the case may be) may be separated from each other by one or more intermediate layers, which are not shown in FIG. 2. In certain preferred embodiments, adhesive layer 26 is immediately adjacent layer A (or layer B as the case may be).

Adhesive layer has an internal surface 25 facing coextruded stack 24. External surface 27 of adhesive layer 26 faces the substrate (e.g., rotor blade). Prior to application to the substrate, for example, during manufacturing, storage, and transportation of the film, external surface 27 of adhesive layer 26 may be covered by release liner 28.

As mentioned previously, in some embodiments, the coextruded layers A and B form coextruded stack 24. In other embodiments, coextruded stack 24 contains, in addition to layers A and B, adhesive layer 26. In those embodiments, liner 28 may be coated or laminated onto coextruded stack 24. In yet other embodiments, coextruded stack 24 contains layers A and B, adhesive layer 24, and liner 26.

In some preferred embodiments, the coextruded stack does not include any UV-curable (and/or cured) layers. In other embodiments, neither layer A nor layer B include any UV-curable (and/or cured) layers, nor any UV-curable (and/or cured) components.

In other embodiments, the film comprises a profile that is a combination of two or more individual profiles (which could be the same or different) as part of a single film that is later slit to produce two or more narrower films, each having a single profile that tapers off at the edges. In preferred instances of these embodiments, the cross-section profile of each of the two or more narrower films has a maximum thickness Ti that is greater than each of the thicknesses at the edge lateral sections (T1 and T2).

Layer A

The composition of the layer A is not limited and the only requirement is that it be made of a polymeric extrudable material. In certain preferred embodiments, the polymeric material is a thermoplastic material or a thermoplastic elastomer material. The polymer may be cross-linked or not-cross-linked. In other preferred embodiments, the layer A is a polymer layer that has been coextruded with layer B.

In certain preferred embodiments, polymers that can be used to make the layer A or that form the layer A include thermoplastic olefins, styrene block copolymers, thermoplastic polyurethanes, thermoplastic copolyesters, and silicone thermoplastics, and combinations thereof. In more preferred embodiments, polymers that can be used to make the layer A or that form the layer A include a thermoplastic elastomer chosen from thermoplastic polyurethanes, thermoplastic copolyesters, and silicone thermoplastics, and combinations thereof. In other embodiments, the thermoplastic elastomer chosen from silicone polyoxamide, aliphatic polyether-based thermoplastic polyurethane, copolyester ether, crosslinked polyurethanes, polyureas, low density polyethylene (LDPE), linear low density polyethylene (LLDPE), styrene-butadiene-styrene block copolymer (SBS), styrene-ethylene butylene-styrene block copolymer (SEBS), styrene-ethylene/propylene-styrene (SEPS) block copolymer, and combinations thereof.

In other embodiments, polymers for the layer A include polycarbonates, fluoropolymers, epoxy-polymers, polyethers, and combinations thereof.

In other preferred embodiments, the layer A contains a polyurethane (PU) polymer which may be a polyurethane homo- or copolymer, most preferably, an extruded thermoplastic elastomer polyurethane polymer. Thermoplastic elastomer polyurethanes are generally known in the art under the abbreviation "TPU". In certain preferred embodiments, the layer A comprises one or more thermoplastic elastomers having an average molecular weight greater than 20,000 g/mole. In other embodiments, the layer A comprises one or more thermoplastic elastomers having an average molecular weight ranging from 20,000 g/mole to 2 million g/mole.

TPU's are formed by the reaction of diisocyanates with short-chain diols (e.g., chain extenders) and diisocyanates with long-chain bifunctional diols (known as polyols). The inventors envision the use of any known TPU in the films of the present disclosure. Examples of TPU's that are commercially available include, for example, under the trade designations KRYSTALGRAN (aliphatic polyether based thermoplastic polyurethane, Hunstman, USA), DESMOPAN, TEXIN, UTECHLLAN from Bayer AG, Germany. The layer A may also contain one or more additives to improve the performance of the polymer composition, for example, but not limited to, anti-oxidation agents, UV-stabilizers, processing additives, fillers and the like.

As mentioned previously, the surface of the layer A has a cross-sectional profile wherein the maximum thickness is Ti and the edge lateral sections have a thickness T1 and T2 respectively. The thickness Ti is greater than the thickness of each of the edge lateral sections (T1, T2).

In certain embodiments, the thickness (Ti) ranges from 50 microns to 500 microns, or from 100 microns to 500 microns, or from 50 microns to 400 microns, or from 100 microns to 350 microns, or from 200 microns to 400 microns, or from 200 microns to 350 microns, or from 250 microns to 350 microns. In other embodiments, Ti may be greater than 200 microns, or greater than 250 microns, or greater than 300 microns, or greater than 350 microns.

In some embodiments, each of the lateral edge sections of layer A (T1 and T2) may have a thickness, independent from each other, from 1 micron to 200 microns, or from 2 microns to 200 microns, or from 5 microns to 150 microns, or from 10 microns to 150 microns, or from 10 microns to 125 microns, with the understanding that the thickness Ti is greater than the thickness of each of the lateral parts (or edges) of layer A T1 and T2.

In certain embodiments, the thickness increases, preferably continuously, from the lateral parts of layer A towards the central part of layer A to reach a maximum thickness Ti. Such a profile can be generated by a combination of linear (either horizontal or having a slope) portions with curved or angular portions. In the case of the film represented in FIGS. 2 and 3, the profile of layer A is an outwardly curved surface having a short horizontal portion. In other preferred embodiments, the increase in thickness is continuous, for example by an outwardly curved shape (as in FIGS. 2 and 3) or a shape having angular sides (as in FIG. 4(b)). The maximum thickness of layer A may be the apex of a curve or it may be a plateau. In some embodiments, the cross-sectional profile may be symmetric. However, in other embodiments, the profile may be non symmetric, i.e. the increase in thickness from one lateral edge towards the inner part may be greater than the increase of the other side. In some embodiments, the thickness T1 and T2 may be substantially the same (the value of Ti being within 5% from the value of T2). Alternatively, the thickness T1 or T2 may not be equal. For example, T1 may be greater than T2. The maximum thickness Ti may be in the middle of layer A (across its width) or offset from it.

In some embodiments, the layer A is made of two or more coextruded layers, each having a different color. In those embodiments, the composition of each of those layers may be the same or different, but at least one of the layers comprises a dye or a pigment so that at least one of the layers has a color different from the color of the other(s) layer. This embodiment is illustrated in FIG. 3, in which layer A comprises three separate layers. A protective film having a multilayer, colored layer A would be useful as a leading edge protection tape in which the colored layer(s) may serve as a visual indicator of the need to replace or repair the protective tape. For example, the colored layer(s) could be Material B ("MB") and/or Material C ("MC") in FIG. 3, with layer Material A "MA") being of a different color. Once the bulk of layer MA has been eroded, then the color of the layer(s) underneath that layer would be visible, indicating that the tape either needs to be replaced (if a large enough portion has been eroded) or repaired (if the damage is localized or does not merit otherwise full replacement).

In certain preferred embodiments, the cross-sectional profile of layer A is continuous. This means the profile is not interrupted by a pattern of gaps and/or grooves. Preferably, the entire surface of layer A (both in widthwise and lengthwise direction) is continuous.

In some embodiments, the surface of layer A is smooth. However, it is to be understood that even in cases where a smooth surface is desired, some unevenness may be present due to manufacturing constraints, i.e. the surface may have a natural surface roughness.

In other embodiments, however, the surface of layer A may be intentionally rough. For example, in some embodiments, particles may be used in layer B in order to create a rough interface between layer A and layer B, which translates into the surface of layer A being rough. In other embodiments, the surface of the layer A has a matte finish.

Layer B

The composition of the layer B is not limited and the only requirement is that it be made of a polymeric extrudable material. In certain preferred embodiments, the polymeric material is a thermoplastic material or a thermoplastic elastomer material. The polymer may be cross-linked or not-cross-linked. In other preferred embodiments, the layer B is a polymer layer that has been coextruded with layer A.

In certain preferred embodiments, polymers that can be used to make the layer B or that form the layer B include thermoplastic olefins, styrene block copolymers, thermoplastic polyurethanes, thermoplastic copolyesters, silicone thermoplastics, and combinations thereof. In more preferred embodiments, polymers that can be used to make the layer B or that form the layer B include a thermoplastic elastomer chosen from thermoplastic olefins, styrene block copolymers, silicone thermoplastics, and combinations thereof. In other embodiments, polymers that can be used to make the layer B or that form the layer B include low density polyethylene (LDPE), Linear Low Density Polyethylene (LLDPE), Styrene-Butadiene-Styrene Block Copolymer (SBS), Styrene-Ethylene/Butylene-Styrene Block Copolymer (SEBS), Styrene-Ethylene/Propylene-Styrene Block copolymer (SEPS) and combinations thereof. In some embodiments, the layer B comprises an immiscible blend of two polymers. In certain preferred embodiments, a dye or pigment is added to layer B.

In other embodiments, polymers for the layer B include polycarbonates, fluoropolymers, epoxy-polymers, polyethers, and combinations thereof.

In other preferred embodiments, the layer B contains a mix of homopolymer propylene, ethylene-propylene copolymer, and a dye. In certain preferred embodiments, the layer B comprises one or more thermoplastic elastomers having an average molecular weight greater than 20,000 g/mole. In other embodiments, the layer B comprises one or more thermoplastic elastomers having an average molecular weight ranging from 20,000 g/mole to 2 million g/mole.

In other preferred embodiments, the layer B has an inverse profile with respect to layer A, such that a coextruded stack comprising layers A and B is substantially flat. As mentioned previously, having a flat film (as opposed to a profiled film) improves the ease of winding the film, coating, lamination, as well as other downstream process steps, including protection of the profiled layer of the film and improve the application of the thin and delicate tapered edges. Thus, in certain preferred embodiments, layer B acts as a liner to layer A and for that reason, in those embodiments, the film has a releasable interface between the layer A and the layer B (without the presence of an adhesive layer in between the layers A and B).

In some embodiments, the interface between the layer A and the layer B is structured with a regular pattern or with a stochastic pattern. A stochastic pattern on the interface can be created, for example, by adding beads to layer B, which, when present on the interface between layers A and B, form protrusions on layer B and corresponding indentations or dimples on layer A. A regular pattern can be obtained by modifying the internal die lip so that the surface of either layer A or layer B so that the interface contains the surface irregularities (protrusions and/or indentations) as the layers are being coextruded.

In the case of a film where layer B acts as a liner to protect layer A, the presence of the surface irregularities on the exposed surface of layer A (from a stochastic pattern, a regular pattern, or other origins) can diffuse incident visible light on the surface and render the surface matte.

As mentioned previously, in some embodiments, the interface between the layer A and the layer B is roughened. A rough interface can be made by adding particles to layer B. The particles may be made from organic or inorganic materials, and may have spherical or non-spherical shapes. Examples of particles useful in these embodiments include polystyrene beads, such as SBX-6 from Sekisui Plastics. Typical sizes for those particles range from 0.5 microns to 25 microns. When present, the particles may be in a proportion from 0.5% to 25% volume/volume based on the volume of the layer B, or in a proportion from 1% to 10% volume/volume based on the volume of the layer B.

Adhesive Layer

The adhesive layer in the films according to the present disclosure is optional and may be made of known adhesive materials. In certain preferred embodiments, the adhesive is a pressure sensitive adhesive (PSA). Pressure sensitive adhesives can be applied to a surface using manual force, which is sufficient to bond the adhesive to the surface.

In some embodiments, the PSA's may not require setting (i.e. hardening through solvent evaporation), chemical or thermal treatment for adhering the adhesive to the substrate. Suitable adhesive materials, in particular but not limited to pressure sensitive adhesive materials, include, for example, acrylic based adhesives, vinyl ether based adhesives, natural or synthetic rubber-based adhesives, poly (alpha-olefins) based adhesives and silicone based adhesives and combinations thereof. Specific examples are disclosed in U.S. Pat. Nos. 4,925,671, 4,693,776, 3,930,102, 4,599,265, 5,116,676, 6,045,922, and 6,048,431, whose disclosure of adhesives is incorporated herein by reference.

Pressure sensitive adhesives suitable to be used in the films of the present disclosure possess certain properties at room temperature including the following: (1) aggressive and permanent tack, (2) adherence with no more than finger pressure, and (3) sufficient ability to hold onto an adherend. Materials that have been found to function well as pressure sensitive adhesives are polymers designed and formulated to exhibit the requisite viscoelastic properties resulting in a desired balance of tack, peel adhesion, and shear holding power.

In some embodiments, the adhesive comprises at least one acrylic-based adhesive, such as (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

Typically, the adhesives may have a viscosity of at least 2,000, or at least 10,000 or from about 18,000 to about 60,000 mPas or greater that 60,000 mPas at room temperature.

In certain embodiments the adhesives for the adhesive layer may be used in combination with settable adhesives or curable liquid adhesives as will be described in greater detail below.

The adhesive materials used in the adhesive layer may also include additives. Such additives may include, for example, pigments, dyes, plasticizers, tackifiers, rheology modifiers, fillers, stabilizers, UV radiation absorbers, antioxidants, processing oils, and the like. The amount of additive(s) used can vary from 0.1 to 50 weight percent of the adhesive material, depending on the end use desired. Also a combination a different adhesives can be used to combine them into a single adhesive mixture. The adhesive layer provided herein may contain a single adhesive layer or two or more than two adhesive layers, preferably superimposed or abutting layers across its thickness.

The adhesive layer may typically have a thickness of from about 5 microns to 100 microns Liner The adhesive layer may be covered on its external surface by an optional release liner for convenient handling and storage. The release liner may be structured on the side facing the adhesive to impart a pattern to the adhesive. The liner may be any release liner or transfer liner known to those skilled in the art. In those embodiments where the liner provides a patterned external surface to the adhesive layer, the release liner may be embossed. Typical release liners include polymer coated paper with a silicone release coating, polyethylene coated polyethylene terephalate (PET) film with silicone release coatings, or a cast polypropylene film with a silicone release coating.

The liner typically has a thickness of between 50 microns and 500 microns.

Ultraviolet Absorbers

In certain embodiments, the adhesives, layer A (e.g., a TPU), and other layers or elements of the film constructions of the present disclosure may contain ultraviolet absorbers. In certain preferred embodiments, the ultraviolet absorbers are incorporated into layer A. Ultraviolet absorbers function by preferentially absorbing ultraviolet radiation and dissipating it as thermal energy. Suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones. Suitable benzophenones include, CYASORB UV-9 (2-hydroxy-4-methoxybenzophenone, CHIMASSORB 81 (or CYASORB UV 531) (2 hyroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2, 4-dimethylphenyl)-1,3,5-triazin-2yl]-5(oxctyloxy) phenol (an exemplary triazine) and CYASORB 3638 (an exemplary benzoxiazine).

Hindered amine light stabilizers (HALS) are efficient stabilizers against light-induced degradation of most polymers. HALS do not generally absorb UV radiation, but act to inhibit degradation of the polymer. HALS typically include tetra alkyl piperidines, such as 2,2,6,6-tetramethyl-4-piperidinamine and 2,2,6,6-tetramethyl-4-piperidinol. Other suitable HALS include compounds available from Ciba, Tarrytown, N.Y. as TINUVIN 123, 144, and 292.

The UVAs and HALS disclosed explicitly here are intended to be examples of materials corresponding to each of these two categories of additives. The present inventors contemplate that other materials not disclosed here but known to those skilled in the art for their properties as UV absorbers or hindered amine light stabilizers can be used in the constructions of this disclosure.

Application of the Film as a Protective Tape

Protective tapes made from films of the present disclosure may be applied to the desired article (e.g., the leading edge of a rotor blade) by removing the release liner and the coextruded layer B, then wrapping the tape around the article. In the case of a rotor blade, the tape is preferably attached to the blade such that it covers the leading edge with its thicker part and the thinner sides of the tape are placed towards the trailing edge of the blade.

Substrates

Typical substrates onto which the films of this disclosure are applied include but are not limited to rotor blades (wind turbines and helicopters), portions of the fuselage or a wing of an aircraft, automobile parts that may be subject to erosion by road debris, and may also include train underfloors.

Other embodiments of the present disclosure are directed to articles comprising a film as described herein. In some embodiments, the article is chosen from a wind turbine blade, a helicopter rotor blade, a train underfloor, a portion of the fuselage or a wing of an aircraft, and an automobile part.

The films of the present disclosure may also be used to make adhesive tapes for providing a grippable surface (e.g. racket handles or stairs), adhesive tapes for providing a moisture barrier, substrates for providing markings (such as, for example, floor markings), graphics, boundaries etc., protective tapes for floors or walls, and protective cover films for displays, among others.

EXEMPLARY EMBODIMENTS

The following embodiments are exemplary in nature and are not meant to limit the scope of the invention described herein. Other natural variations of the embodiments in this disclosure would be apparent to those with ordinary skill in the art.

The present disclosure refers to features illustrated or described as part of certain embodiments and/or the figures. The inventors envision that any of those features can be combined with any other feature in the present application to yield another embodiment. The present disclosure includes those and other modifications and variations.

In particular, by the use of the phrase a "film according to any of the preceding embodiments," the inventors intend to describe an embodiment that contains the features of the embodiment being discussed in combination with the features of any of the previous embodiments.

1. A coextruded film comprising:
   a layer A having a first major surface and a second major surface opposite the first major surface;
   wherein the cross-section profile of the first major surface of the layer A is substantially flat and the cross-section profile of the second major surface of the layer A is non-flat,
   a layer B having a first major surface and a second major surface opposite the first major surface;
   wherein the first major surface of the layer B is immediately adjacent to the second major surface of the layer A,
   wherein the cross-section profile of the second major surface of the layer B is substantially flat,
   wherein the cross-section profile of the first major surface of the layer B is the inverse of the cross-section profile of the second major surface of the layer A, and
   wherein the coextruded film has a releasable interface between the layer A and the layer B.

2. A coextruded film comprising:
   a layer A having a first major surface and a second major surface opposite the first major surface;
   wherein the cross-section profile of the first major surface of the layer A is substantially flat and the cross-section profile of the second major surface of the layer A is non-flat,
   a layer B having a first major surface and a second major surface opposite the first major surface;
   wherein the first major surface of the layer B is immediately adjacent to the second major surface of the layer A,
   wherein the cross-section profile of the second major surface of the layer B is substantially flat,
   wherein the cross-section profile of the first major surface of the layer B is the inverse of the cross-section profile of the second major surface of the layer A,
   an adhesive layer adjacent the first major surface of the layer A, and
   a liner layer adjacent the adhesive layer opposite the first major surface of the layer A, and
   wherein the coextruded film has a releasable interface between the layer A and the layer B.

3. A coextruded film comprising:
   a layer A having a first major surface and a second major surface opposite the first major surface;

wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
   an adhesive layer adjacent the first major surface of the layer B, and
   a liner layer adjacent the adhesive layer opposite the first major surface of the layer B, and
wherein the coextruded film has a releasable interface between the layer A and the layer B.

4. A film comprising a coextruded stack, wherein the coextruded stack comprises:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the film further comprises:
   an adhesive layer adjacent the first major surface of the layer A, and
   a liner adjacent the adhesive layer opposite the first major surface of the layer A, and
wherein the coextruded stack has a releasable interface between the layer A and the layer B.

5. A film comprising a coextruded stack, wherein the coextruded stack comprises:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the film further comprises:
   an adhesive layer adjacent the first major surface of the layer B, and
   a liner adjacent the adhesive layer opposite the first major surface of the layer B, and
wherein the coextruded stack has a releasable interface between the layer A and the layer B.

6. A film consisting essentially of the following layers: a coextruded stack, an adhesive layer, and a liner,
wherein the coextruded stack comprises:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the adhesive layer is immediately adjacent the first major surface of the layer A, and
wherein the liner is immediately adjacent the adhesive layer opposite the first major surface of the layer A, and
wherein the coextruded stack has a releasable interface between the layer A and the layer B.

7. A coextruded film comprising:
   a layer A having a first major surface and a second major surface opposite the first major surface;
wherein the cross-section profile of the first major surface of the layer A is substantially flat and at least a portion of the cross-section profile of the second major surface of the layer A has a "shaped profile",
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A, and
wherein the coextruded film has a releasable interface between the layer A and the layer B.

8. A coextruded film comprising:
   a layer A having a first major surface and a second major surface opposite the first major surface;
wherein the cross-section profile of the first major surface of the layer A is substantially flat and at least a portion of the cross-section profile of the second major surface of the layer A is curved,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A, and
wherein the coextruded film has a releasable interface between the layer A and the layer B.

9. A coextruded film comprising:
   a layer A having a first major surface and a second major surface opposite the first major surface;
wherein the cross-section profile of the first major surface of the layer A is substantially flat and at least a portion of the cross-section profile of the second major surface of the layer A is trapezoidal,
   a layer B having a first major surface and a second major surface opposite the first major surface;
wherein the first major surface of the layer B is immediately adjacent to the second major surface of the layer A, wherein the cross-section profile of the second major surface of the layer B is substantially flat,
wherein the cross-section profile of the first major surface of the layer B is the inverse of the cross-section profile of the second major surface of the layer A, and
wherein the coextruded film has a releasable interface between the layer A and the layer B.

10. A coextruded film comprising:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, and
wherein the coextruded film has a releasable interface between the layer A and the layer B.

11. A coextruded film comprising:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein the ratio Ti/T1 is at least 2:1, and
wherein the coextruded film has a releasable interface between the layer A and the layer B.

12. A coextruded film comprising:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein the ratio Ti/T1 is at least 3:1, and
wherein the coextruded film has a releasable interface between the layer A and the layer B.

13. A coextruded film comprising:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein the ratio Ti/T1 is at least 5:1, and
wherein the coextruded film has a releasable interface between the layer A and the layer B.

14. A coextruded film comprising:
   a layer A having a first major surface and a second major surface opposite the first major surface;
wherein the cross-section profile of the first major surface of the layer A is substantially flat and the cross-section profile of the second major surface of the layer A is non-flat,
   a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein the ratio Ti/T1 is at least 10:1, and
wherein the coextruded film has a releasable interface between the layer A and the layer B.

15. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein T1 and T2, independently from each other, range from 1 micron to 200 microns, Ti ranges from 50 microns to 500 microns, and
wherein the coextruded film has a releasable interface between the layer A and the layer B.

16. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, wherein, on the cross-section profile of the second major surface of the layer A, there are no global minima between T1 and Ti and there are no global minima between Ti and T2, and
wherein the coextruded film has a releasable interface between the layer A and the layer B.

17. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein at least one of the layer A or the layer B comprises one or more thermoplastic elastomer chosen from thermoplastic olefins, styrene block copolymers, thermoplastic polyurethanes, thermoplastic copolyesters, silicone thermoplastics, and combinations thereof, and
wherein the coextruded film has a releasable interface between the layer A and the layer B.

18. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein at least one of the layer A or the layer B comprises one or more thermoplastic elastomer chosen from thermoplastic olefins, styrene block copolymers, thermoplastic polyurethanes, thermoplastic copolyesters, silicone thermoplastics, and combinations thereof,
wherein the average molecular weight of the thermoplastic elastomer is greater than 20,000 g/mole wherein the coextruded film has a releasable interface between the layer A and the layer B.

19. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein layer A is multilayer film, and
wherein the coextruded film has a releasable interface between the layer A and the layer B.

20. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A, an adhesive layer adjacent the first major surface of the layer A, and
a liner layer adjacent the adhesive layer opposite the first major surface of the layer A,
wherein layer A is multilayer film, and
wherein the coextruded film has a releasable interface between the layer A and the layer B.

21. A film comprising a coextruded stack, wherein the coextruded stack comprises:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the film further comprises:
an adhesive layer adjacent the first major surface of the layer A, and
a liner adjacent the adhesive layer opposite the first major surface of the layer A,
wherein layer A is multilayer film, and
wherein the coextruded stack has a releasable interface between the layer A and the layer B.

22. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2,
wherein layer A is multilayer film, and
wherein the coextruded film has a releasable interface between the layer A and the layer B.

23. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat, and
wherein the cross-section profile of the first major surface of the layer B is the inverse of the cross-section profile of the second major surface of the layer A.

24. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
an adhesive layer adjacent the first major surface of the layer A, and
a liner layer adjacent the adhesive layer opposite the first major surface of the layer A.

25. A film comprising a coextruded stack, wherein the coextruded stack comprises:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the film further comprises:
an adhesive layer adjacent the first major surface of the layer A, and
a liner adjacent the adhesive layer opposite the first major surface of the layer A.

26. A film consisting essentially of the following layers: a coextruded stack, an adhesive layer, and a liner,
wherein the coextruded stack comprises:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the adhesive layer is immediately adjacent the first major surface of the layer A, and
wherein the liner is immediately adjacent the adhesive layer opposite the first major surface of the layer A.

27. A coextruded film comprising:
a layer A having a first major surface and a second major surface opposite the first major surface;
wherein the cross-section profile of the first major surface of the layer A is substantially flat and at least a portion of the cross-section profile of the second major surface of the layer A has a "shaped profile",
a layer B having a first major surface and a second major surface opposite the first major surface;
wherein the first major surface of the layer B is immediately adjacent to the second major surface of the layer A,
wherein the cross-section profile of the second major surface of the layer B is substantially flat, and
wherein the cross-section profile of the first major surface of the layer B is the inverse of the cross-section profile of the second major surface of the layer A.

28. A coextruded film comprising:
a layer A having a first major surface and a second major surface opposite the first major surface;
wherein the cross-section profile of the first major surface of the layer A is substantially flat and at least a portion of the cross-section profile of the second major surface of the layer A is curved,
a layer B having a first major surface and a second major surface opposite the first major surface;
wherein the first major surface of the layer B is immediately adjacent to the second major surface of the layer A,
wherein the cross-section profile of the second major surface of the layer B is substantially flat, and
wherein the cross-section profile of the first major surface of the layer B is the inverse of the cross-section profile of the second major surface of the layer A.

29. A coextruded film comprising:
a layer A having a first major surface and a second major surface opposite the first major surface;
wherein the cross-section profile of the first major surface of the layer A is substantially flat and at least a portion of the cross-section profile of the second major surface of the layer A is trapezoidal,
a layer B having a first major surface and a second major surface opposite the first major surface;
wherein the first major surface of the layer B is immediately adjacent to the second major surface of the layer A,
wherein the cross-section profile of the second major surface of the layer B is substantially flat, and
wherein the cross-section profile of the first major surface of the layer B is the inverse of the cross-section profile of the second major surface of the layer A.

30. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2, and
wherein Ti is greater than each of T1 and T2.

31. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, and
wherein the ratio Ti/T1 is at least 2:1

32. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, and
wherein T1 and T2, independently from each other, range from 1 micron to 200 microns, Ti ranges from 50 microns to 500 microns.

33. A coextruded film comprising:
a layer A having a first major surface and a second major surface opposite the first major surface;
wherein the cross-section profile of the first major surface of the layer A is substantially flat and the cross-section profile of the second major surface of the layer A is non-flat,
a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A, wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, and wherein, on the cross-section profile of the second major surface of the layer A, there are no global minima between T1 and Ti and there are no global minima between Ti and T2.

34. A coextruded film comprising:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein at least one of the layer A or the layer B comprises one or more thermoplastic elastomer chosen from thermoplastic olefins, styrene block copolymers, thermoplastic polyurethanes, thermoplastic copolyesters, silicone thermoplastics, and combinations thereof.

35. A coextruded film comprising:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein at least one of the layer A or the layer B comprises one or more thermoplastic elastomer chosen from thermoplastic olefins, styrene block copolymers, thermoplastic polyurethanes, thermoplastic copolyesters, silicone thermoplastics, and combinations thereof, and
wherein the average molecular weight of the thermoplastic elastomer is greater than 20,000 g/mole.

36. A coextruded film comprising:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A, and
wherein layer A is multilayer film.

37. A coextruded film comprising:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
    an adhesive layer adjacent the first major surface of the layer A, and
    a liner layer adjacent the adhesive layer opposite the first major surface of the layer A, and
wherein layer A is multilayer film.

38. A film comprising a coextruded stack, wherein the coextruded stack comprises:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the film further comprises:
    an adhesive layer adjacent the first major surface of the layer A, and
    a liner adjacent the adhesive layer opposite the first major surface of the layer A, and
wherein layer A is multilayer film.

39. A coextruded film comprising:
    a layer A having a first major surface and a second major surface opposite the first major surface;
wherein the cross-section profile of the first major surface of the layer A is substantially flat and the cross-section profile of the second major surface of the layer A is non-flat,
    a layer B having a first major surface and a second major surface opposite the first major surface;
wherein the first major surface of the layer B is immediately adjacent to the second major surface of the layer A,
wherein the cross-section profile of the second major surface of the layer B is substantially flat,
wherein the cross-section profile of the first major surface of the layer B is the inverse of the cross-section profile of the second major surface of the layer A,
wherein the cross-section profile of the second major surface of the layer A has an inner section between a first edge lateral section and a second edge lateral section,
wherein the maximum thickness of the inner section is Ti, the thickness of the first edge lateral section is T1, and the thickness of the second edge lateral section is T2,
wherein Ti is greater than each of T1 and T2, and
wherein layer A is multilayer film.

40. A coextruded film comprising:
- a layer A having a first major surface and a second major surface opposite the first major surface;
- wherein the cross-section profile of the first major surface of the layer A is substantially flat and the cross-section profile of the second major surface of the layer A is non-flat and has two or more maxima where the thickness of the layer A is greater than the thickness of the surrounding portion,
- a layer B having a first major surface and a second major surface opposite the first major surface;
- wherein the first major surface of the layer B is immediately adjacent to the second major surface of the layer A,
- wherein the cross-section profile of the second major surface of the layer B is substantially flat,
- wherein the cross-section profile of the first major surface of the layer B is the inverse of the cross-section profile of the second major surface of the layer A, and
- wherein the coextruded film has a releasable interface between the layer A and the layer B.

41. A film according to any of the preceding embodiments, wherein the film has a cross-section rectangular profile.

42. A film according to any of the preceding embodiments, wherein both the top and bottom profiles of the film are substantially flat.

43. A film according to any of the preceding embodiments, wherein the thickness of the film at any point along the cross-section of the film has a variation of less than 10% from the average thickness of the film.

44. A film according to any of the preceding embodiments, wherein the thickness of the film at any point along the cross-section of the film has a variation of less than 5% from the average thickness of the film.

45. A film according to any of the preceding embodiments, wherein at least a portion of the cross-section profile of the second major surface of the layer A has a shaped profile.

46. A film according to any of the preceding embodiments, wherein at least a portion of the cross-section profile of the second major surface of the layer A is curved.

47. A film according to any of the preceding embodiments, wherein at least a portion of the cross-section profile of the second major surface of the layer A is trapezoidal.

48. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, and wherein Ti is greater than each of T1 or T2.

49. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 50 microns to 500 microns, and wherein T1 and T2, independently from each other, range from 1 micron to 200 microns.

50. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 100 microns to 400 microns, and wherein T1 and T2, independently from each other, range from 1 micron to 200 microns.

51. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 50 microns to 400 microns, and wherein T1 and T2, independently from each other, range from 2 micron to 200 microns.

52. A film according to any of the preceding embodiments, wherein the cross-section profile of the second major surface of the layer A has an inner section between a first edge lateral section and a second edge lateral section, wherein the thickness of the inner section is Ti, the thickness of the first edge lateral section is T1, and the thickness of the second edge lateral section is T2, wherein Ti is greater than each of T1 or T2, wherein Ti ranges from 100 microns to 400 microns, and wherein T1 and T2, independently from each other, range from 2 microns to 200 microns.

53. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 100 microns to 350 microns, and wherein T1 and T2, independently from each other, range from 5 microns to 150 microns.

54. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 200 microns to 350 microns, and wherein T1 and T2, independently from each other, range from 10 microns to 150 microns.

55. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, wherein Ti ranges from 250 microns to 350 microns, and wherein T1 and T2, independently from each other, range from 10 microns to 125 microns.

56. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 2:1 to 400:1.
57. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 2:1 to 200:1.
58. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 2:1 to 100:1.
59. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 2:1 to 10:1.
60. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 3:1 to 400:1.
61. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 3:1 to 200:1.
62. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 3:1 to 100:1.
63. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 3:1 to 10:1.
64. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 5:1 to 400:1.
65. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 5:1 to 200:1.
66. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 5:1 to 100:1.
67. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 5:1 to 10:1.
68. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 10:1 to 400:1.
69. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 10:1 to 200:1.
70. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 10:1 to 100:1.
71. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 10:1 to 50:1.

72. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 1.2:1 to 5:1.

73. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 1.2:1 to 3:1.

74. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is from 1.2:1 to 2:1.

75. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is at least 2:1.

76. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is at least 3:1.

77. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is at least 10:1.

78. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein Ti is greater than each of T1 or T2, and wherein the ratio Ti/T1 is at least 1.5:1.

79. A film according to any of the preceding embodiments, wherein the cross-section profile of the second major surface of the layer A has an inner section between a first edge lateral section and a second edge lateral section, wherein the maximum thickness of the inner section is Ti, the thickness of the first edge lateral section is T1, and the thickness of the second edge lateral section is T2, wherein, on the cross-section profile of the second major surface of the layer A, there are no global minima between T1 and Ti and there are no global minima between Ti and T2.

80. A film according to any of the preceding embodiments, wherein the coextruded portion of the coextruded film further comprises an adhesive layer adjacent the first major surface of the layer A, and a liner adjacent the adhesive layer opposite the first major surface of the layer A.

81. A film according to any of the preceding embodiments, wherein the coextruded portion of the coextruded film further comprises an adhesive layer adjacent the first major surface of the layer B, and a liner adjacent the adhesive layer opposite the first major surface of the layer B.

82. A film according to any of the preceding embodiments, wherein the non-coextruded portion of the film further comprises an adhesive layer adjacent the first major surface of the layer A, and a liner adjacent the adhesive layer opposite the first major surface of the layer A.

83. A film according to any of the preceding embodiments, wherein the non-coextruded portion of the film further comprises an adhesive layer adjacent the first major surface of the layer B, and a liner adjacent the adhesive layer opposite the first major surface of the layer B.

84. A film according to any of the preceding embodiments, wherein the interface between the layer A and the layer B is structured with a regular pattern.

85. A film according to any of the preceding embodiments, wherein the interface between the layer A and the layer B is structured with a stochastic pattern.

86. A film according to any of the preceding embodiments, wherein the interface between the layer A and the layer B is roughened.

87. A film according to any of the preceding embodiments, wherein the interface between the layer A and the layer B is matte.

88. A film according to any of the preceding embodiments, wherein the layer B comprises an immiscible blend of two polymers.

89. A film according to any of the preceding embodiments, wherein the layer A comprises an immiscible blend of two polymers.

90. A film according to any of the preceding embodiments, comprising an adhesive layer immediately adjacent the first major surface of the layer A, wherein the adhesive layer comprises one or more adhesives chosen from styrene block copolymers, silicone, copolyesters, and acrylics.

91. A film according to any of the preceding embodiments, comprising an adhesive layer immediately adjacent the first major surface of the layer B, wherein the adhesive layer comprises one or more adhesives chosen from styrene block copolymers, silicone, copolyesters, and acrylics.

92. A film according to any of the preceding embodiments, comprising an adhesive layer immediately adjacent the first major surface of the layer A comprises one or more adhesives chosen from styrene block copolymers and acrylic adhesives
93. A film according to any of the preceding embodiments, comprising an adhesive layer immediately adjacent the first major surface of the layer B comprises one or more adhesives chosen from styrene block copolymers and acrylic adhesives.
94. A film according to any of the preceding embodiments, wherein the layer A is a multilayer film.
95. A film according to any of the preceding embodiments, wherein the layer A is a multilayer film, wherein the color of each layer in the multilayer film is chosen independently from the color of the other layers.
96. A film according to any of the preceding embodiments, wherein the layer A is a multilayer film, wherein the modulus of elasticity of each layer in the multilayer film is chosen independently from the modulus of elasticity of the other layers.
97. A film according to any of the preceding embodiments, wherein the layer A is a multilayer film, wherein the color of the outermost layer is different from the color of the layer immediately adjacent to the outermost layer.
98. A film according to any of the preceding embodiments, wherein the layer B is a multilayer film.
99. A film according to any of the preceding embodiments, wherein the layer B comprises particles.
100. A film according to any of the preceding embodiments, wherein the layer B comprises particles chosen from organic materials having spherical shapes.
101. A film according to any of the preceding embodiments, wherein the layer B comprises particles having a size ranging from 0.5 microns to 25 microns.
102. A film according to any of the preceding embodiments, wherein the layer B comprises particles in a proportion from 0.5% to 25% volume/volume based on the volume of the layer B.
103. A film according to any of the preceding embodiments, wherein the layer B comprises particles in a proportion from 5% to 25% volume/volume based on the volume of the layer B.
104. A film according to any of the preceding embodiments, wherein the layer B comprises particles in a proportion from 10% to 20% volume/volume based on the volume of the layer B.
105. A film according to any of the preceding embodiments, wherein the film does not include a photo-initiator or a thermal initiator.
106. A film according to any of the preceding embodiments, wherein the layer A comprises a thermoplastic elastomer.
107. A film according to any of the preceding embodiments, wherein both layer A and layer B comprise one or more thermoplastic elastomers having an average molecular weight greater than 20,000 g/mole.
108. A film according to any of the preceding embodiments, wherein both layer A and layer B comprise one or more thermoplastic elastomers having an average molecular weight ranging from 20,000 g/mole to 2 million g/mole.
109. A film according to any of the preceding embodiments, wherein the layer A comprises one or more thermoplastic elastomers having an average molecular weight greater than 20,000 g/mole.
110. A film according to any of the preceding embodiments, wherein the layer A comprises one or more thermoplastic elastomers having an average molecular weight ranging from 20,000 g/mole to 2 million g/mole.
111. A film according to any of the preceding embodiments, wherein the layer A comprises a thermoplastic elastomer chosen from thermoplastic olefins, styrene block copolymers, thermoplastic polyurethanes, thermoplastic copolyesters, silicone thermoplastics, and combinations thereof.
112. A film according to any of the preceding embodiments, wherein the layer A comprises a thermoplastic elastomer chosen from thermoplastic polyurethanes, thermoplastic copolyesters, silicone thermoplastics, and combinations thereof
113. A film according to any of the preceding embodiments, wherein the layer A comprises a thermoplastic elastomer chosen from silicone polyoxamide, aliphatic polyether-based thermoplastic polyurethane, copolyester ether, crosslinked polyurethanes, polyureas, low density polyethylene (LOPE), linear low density polyethylene (LLDPE), styrene-butadiene-styrene block copolymer (SBS), styrene-ethylene butylene-styrene block copolymer (SEBS), styrene-ethylene/propylene-styrene (SEPS) block copolymer, and combinations thereof
114. A film according to any of the preceding embodiments, wherein the layer A comprises a thermoplastic elastomer chosen from silicone polyoxamide, aliphatic polyether-based thermoplastic polyurethane, copolyester ether, crosslinked polyurethanes, polyureas, and combinations thereof
115. A film according to any of the preceding embodiments, wherein the layer B comprises a thermoplastic elastomer.
116. A film according to any of the preceding embodiments, wherein the layer B comprises one or more thermoplastic elastomers having an average molecular weight greater than 20,000 g/mole.
117. A film according to any of the preceding embodiments, wherein the layer B comprises one or more thermoplastic elastomers having an average molecular weight ranging from 20,000 g/mole to 2 million g/mole.
118. A film according to any of the preceding embodiments, wherein the layer B comprises a thermoplastic elastomer chosen from thermoplastic olefins, styrene block copolymers, thermoplastic polyurethanes, thermoplastic copolyesters, silicone thermoplastics, and combinations thereof
119. A film according to any of the preceding embodiments, wherein the layer B comprises a thermoplastic elastomer from silicone polyoxamide, aliphatic polyether-based thermoplastic polyurethane, copolyester ether, crosslinked polyurethanes, polyureas, low density polyethylene (LDPE), linear low density polyethylene (LLDPE), styrene-butadiene-styrene block copolymer (SBS), styrene-ethylene butylene-styrene block copolymer (SEBS), styrene-ethylene/propylene-styrene (SEPS) block copolymer, and combinations thereof.
120. A film according to any of the preceding embodiments, wherein the layer B comprises a thermoplastic elastomer from low density polyethylene (LDPE), linear low density polyethylene (LLDPE), styrene-butadiene-styrene block copolymer (SBS), styrene-ethylene butylene-styrene block copolymer (SEBS), styrene-ethylene/propylene-styrene (SEPS) block copolymer, and combinations thereof
121. A film according to any of the preceding embodiments, wherein the coextruded stack does not include any UV-curable layers.
122. A film according to any of the preceding embodiments, wherein the coextruded stack does not include any UV-cured layers.

123. A film according to any of the preceding embodiments, wherein neither layer A nor layer B include any UV-curable layers.
124. A film according to any of the preceding embodiments, wherein neither layer A nor layer B include any UV-cured components.
125. An article comprising a film according to any of the preceding embodiments.
126. An article comprising a film according to any of the preceding embodiments, wherein the article is a blade from a wind turbine.
127. An article comprising a film according to any of the preceding embodiments, wherein the article is a helicopter blade.
128. An article comprising a film according to any of the preceding embodiments, wherein the article is chosen from adhesive tapes having a grippable surface, adhesive tapes having moisture barrier properties, graphic films, a protective films, airplane wings, airplane fuselages, helicopter blades, automobile hoods, and automobile parts.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis. Reagents were purchased from Sigma Aldrich Company, St. Louis, Mo., USA, unless otherwise indicated.

Example 1

Figure 5A:
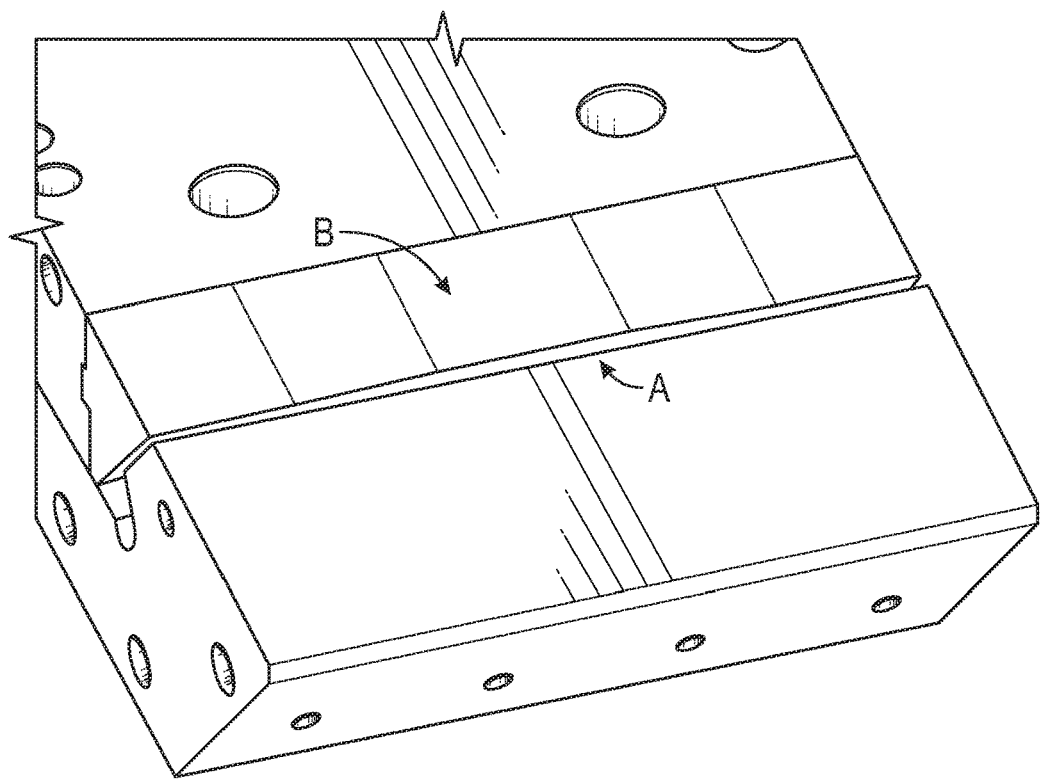
FIGS. 5(a) and 5(b) show a die used to prepare exemplary embodiments of the present disclosure, and the profile of the slot gap of the die.
Figure 5B:
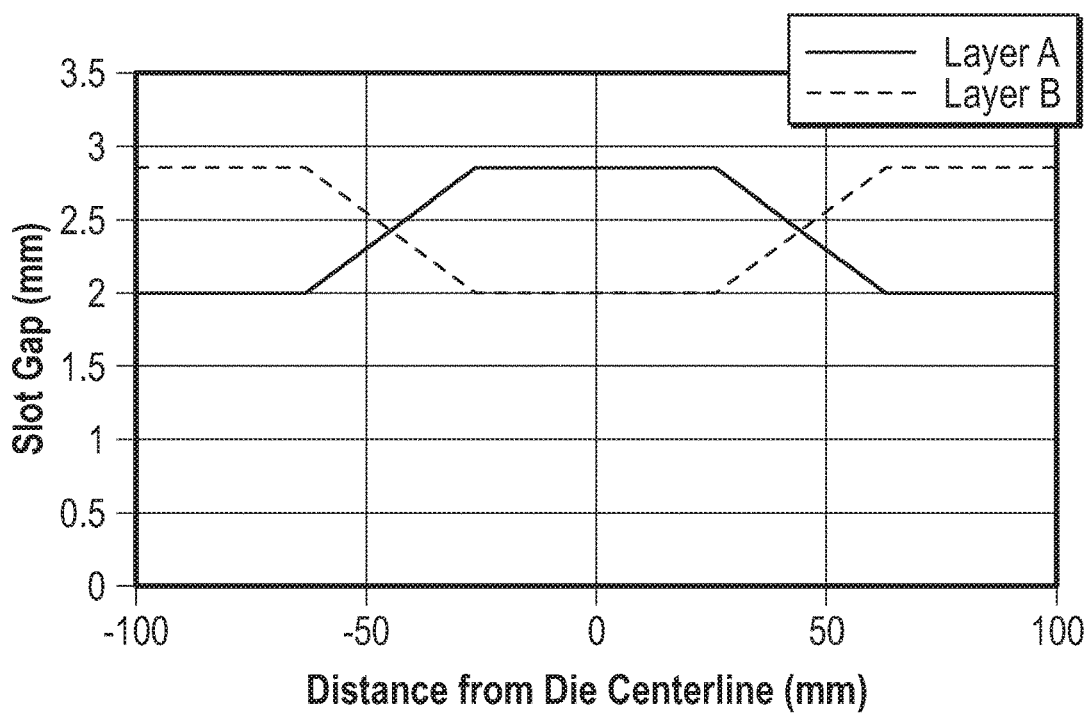

A die tip was inserted in an 8 inch (203.2 mm) wide, 2-manifold die with replaceable internal point of confluence, where the Layer A channel had a 0.115 inch (2.92 mm) gap over the center 2 inches (50.8 mm) of the tip, linearly tapered down to 0.080 inch (2.032 mm) over the 1.5 inch (38.1 mm) on either side and then remained at 0.080 inch (2.032 mm) out to each edge. The Layer B channel had a 0.080 inch (2.032 mm) gap in the center 2 inches (50.8 mm), expanding up to 0.115 inch (2.92 mm) over the 1.5 inch (38.1 mm) on either side and then remaining at 0.115 inch (2.92 mm) out to the edge. This profile was calculated to produce an internal interface with the Layer A three times thicker in the center than at the edges. The die is shown in FIG. 5(a), and the profile of the slot gap of the die is shown in FIG. 5(b).

Aliphatic polyether-based thermoplastic Polyurethane (KRYSTALGRAN PE102-200, Huntsman, Salt Lake City Utah, USA) was fed into an extruder at a rate of 12 lbs/hr, (5.44 kg/hr) which in turn fed the Layer A channel of the previously described die. A 69.994/30/0.006 mix of homopolymer polypropylene (3857, Total Petrochemicals, Houston Tex.), ethylene propylene copolymer (PRO-FAX SR549M, LyondellBasill Industries, Houston Tex. USA), and Ceres Blue 3R dye (LANXESS AG, Cologne, Germany) and was fed into an extruder at a rate of 10 lbs/hr (4.54 kg/hr), which was in turn fed into the Layer B channel of the previously described die. These materials are all coextrudable with each other and are all melt processable at a temperature of 154 degrees C. (310 degrees F.) or greater. The extruders and die were heated to temperatures of 204 to 215 degrees C. (400 to 420 degrees F.) during the extrusion of this film sample.

The resulting multilayered coextrusion flowed from the die, and was cast onto a chilled casting wheel held at 15.5 degrees C. (60 degrees F.) with electrostatic pinning, turning at 7 fpm (2.13 meter/min), which produced the multilayered polymer film.

Figure 6:
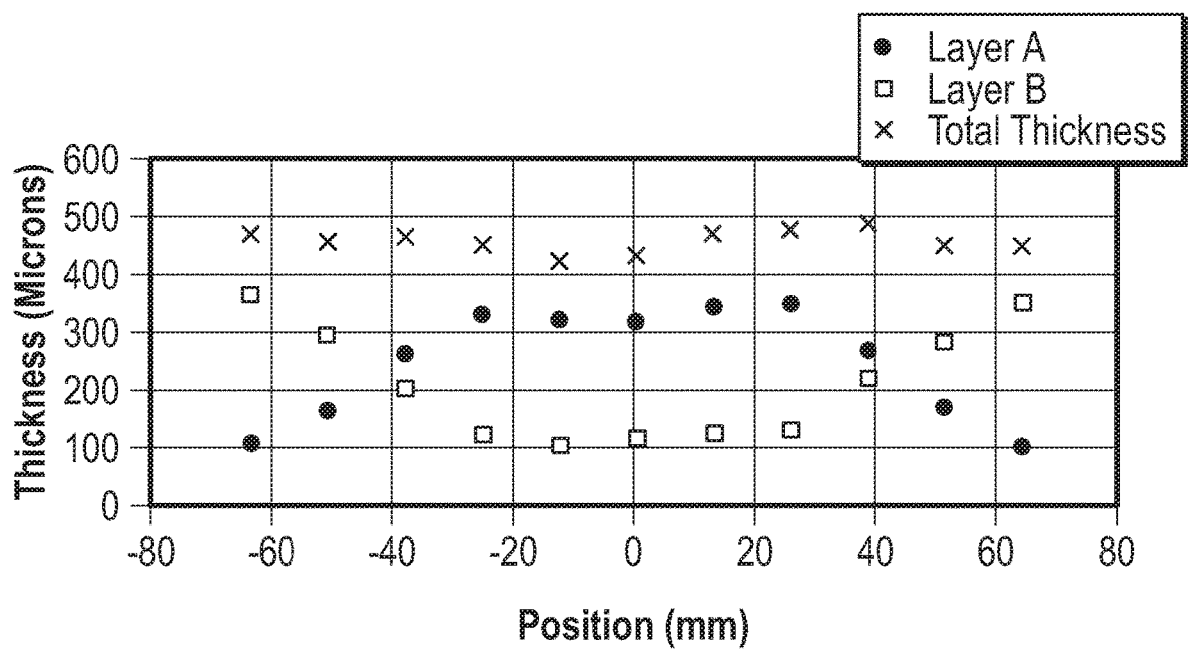
FIG. 6 shows a thickness profile of an exemplary embodiment of the present disclosure.

The edges of the multilayered laminate were slit with a razor blade to remove the edge effects from the sample, to create a multilayered laminate that was 5 inches (127 mm) wide. The sample was cross sectioned, and the thickness of the urethane Layer A and polypropylene Layer B were measured with a Nikon LV100NDA microscope running NIS-Elements software. The thickness was measured every 0.5 inches (1.27 cm) across the sample. The thickness results are shown in Table 1 and FIG. 6.

TABLE 1

Thicknesses of Layers A and B and the total film thickness of Example 1.

| Cross Web Position (mm) | Layer A Thickness (microns) | Layer B Thickness (microns) | Total Caliper (sum of Layer A and Layer B, microns) |
|---|---|---|---|
| −63.5 | 107 | 364 | 471 |
| −50.8 | 163 | 294 | 457 |
| −38.1 | 263 | 202 | 465 |
| −25.4 | 331 | 120 | 451 |
| −12.7 | 321 | 102 | 423 |
| 0 | 318 | 115 | 433 |
| 12.7 | 345 | 124 | 469 |
| 25.4 | 350 | 128 | 478 |
| 38.1 | 268 | 220 | 488 |
| 50.8 | 168 | 283 | 451 |
| 63.5 | 100 | 350 | 450 |

Example 2

An adhesive construction was made by coating an acrylic adhesive syrup onto a 2-sided poly coated kraft paper release liner using a notch bar coater set with a gap of 0.002 inches (50.8 microns). The construction was cured with a 1380 mJ/cm^2 dose of UVA from 350BL UV bulbs in a nitrogen inerted chamber and wound into a roll.

The adhesive side of the adhesive construction was laminated to the urethane side of the multilayered polymer film described in Example 1, and passed through a nip held at about 10 pounds per linear inch to create a multilayered laminate.

Example 3

A multilayered polymer film was substantially the same, and made in the same way, as the multilayered polymer film described in Example 1, except that the speed of the casting wheel was increased to 13 fpm (3.96 meter per minute) to reduce the thickness of the overall film and its constituent layers.

Figure 7:
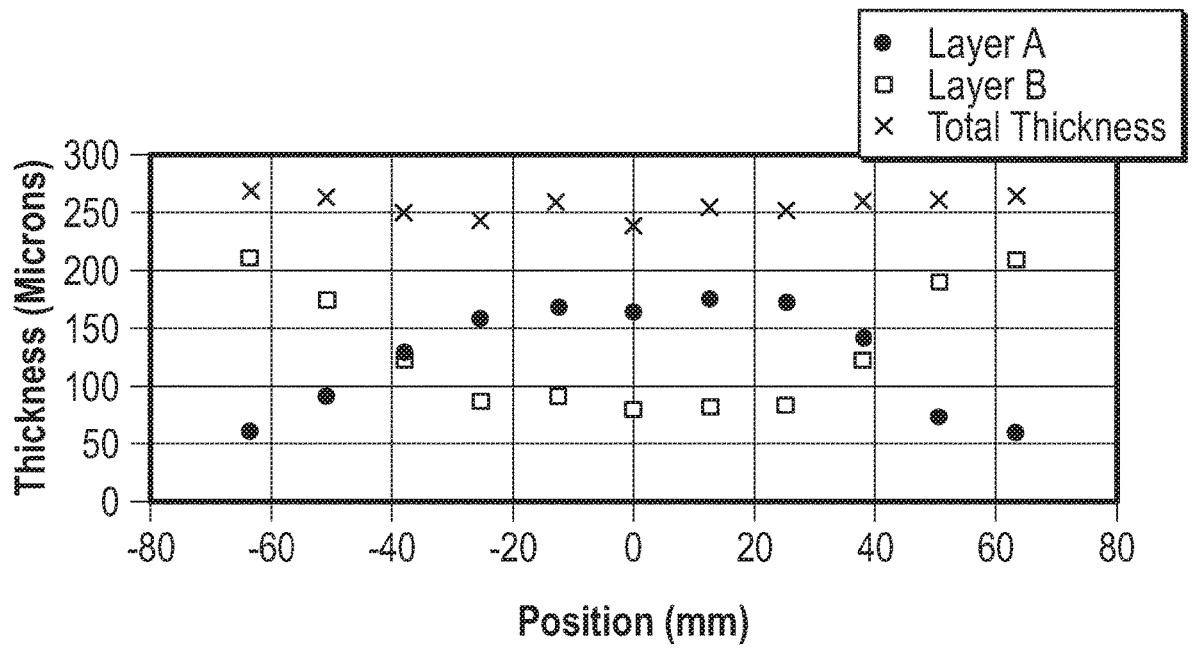
FIG. 7 shows a thickness profile of an exemplary embodiment of the present disclosure.

The edges of the multilayered laminate were slit with a razor blade to remove the edge effects from the sample, to create a multilayered laminate that was 5 inches (127 mm) wide. The sample was cross sectioned, and the thickness of the urethane Layer A and polypropylene Layer B were measured with a Nikon LV100NDA microscope running NIS-Elements software. The thickness was measured every 0.5 inches (1.27 cm) across the sample. The thickness results are shown in Table 2 and FIG. 7.

TABLE 2

Thickness of Layers A and B and total film thickness for Example 3.

| Cross Web Position (mm) | Layer A Thickness (microns) | Layer B Thickness (microns) | Total Caliper (sum of Layer A and Layer B, microns) |
|---|---|---|---|
| −63.5 | 58 | 210 | 268 |
| −50.8 | 90 | 174 | 264 |
| −38.1 | 129 | 121 | 250 |
| −25.4 | 158 | 85 | 243 |
| −12.7 | 168 | 91 | 259 |
| 0 | 162 | 78 | 240 |
| 12.7 | 175 | 80 | 255 |
| 25.4 | 171 | 81 | 252 |
| 38.1 | 140 | 120 | 260 |
| 50.8 | 71 | 190 | 261 |
| 63.5 | 56 | 209 | 265 |
| 76.2 | 53 | 210 | 263 |

Example 4

Figure 8A:
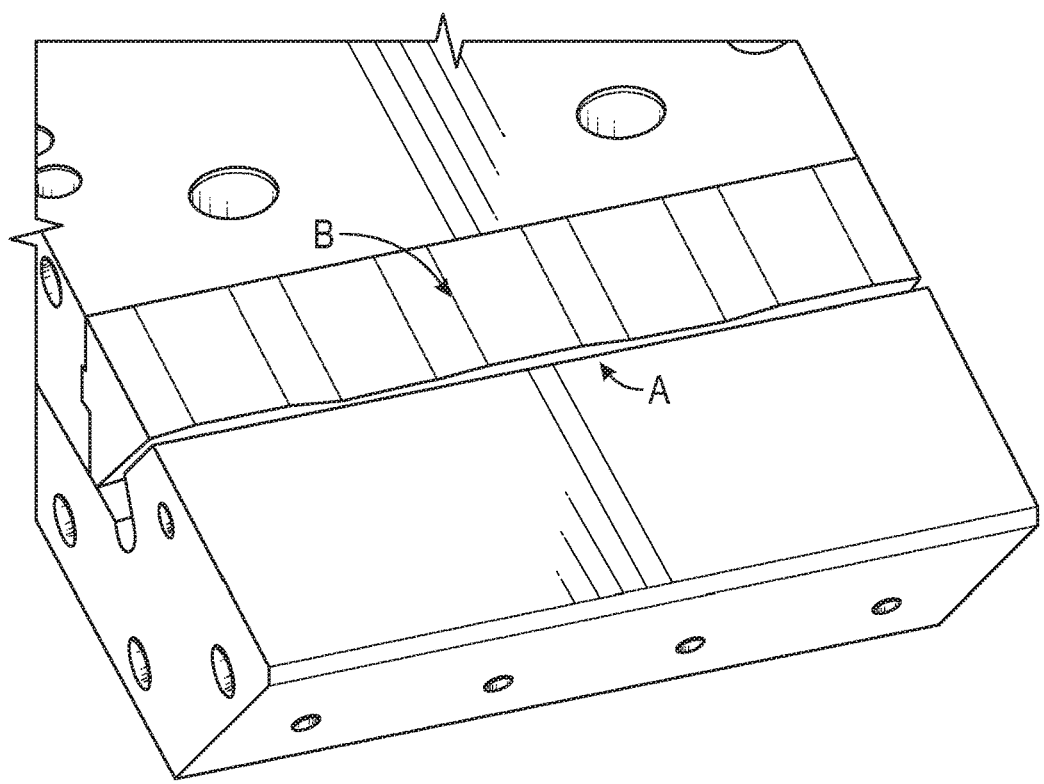
FIGS. 8(a) and 8(b) show a die used to prepare exemplary embodiments of the present disclosure, and the profile of the slot gap of the die.
Figure 8B:
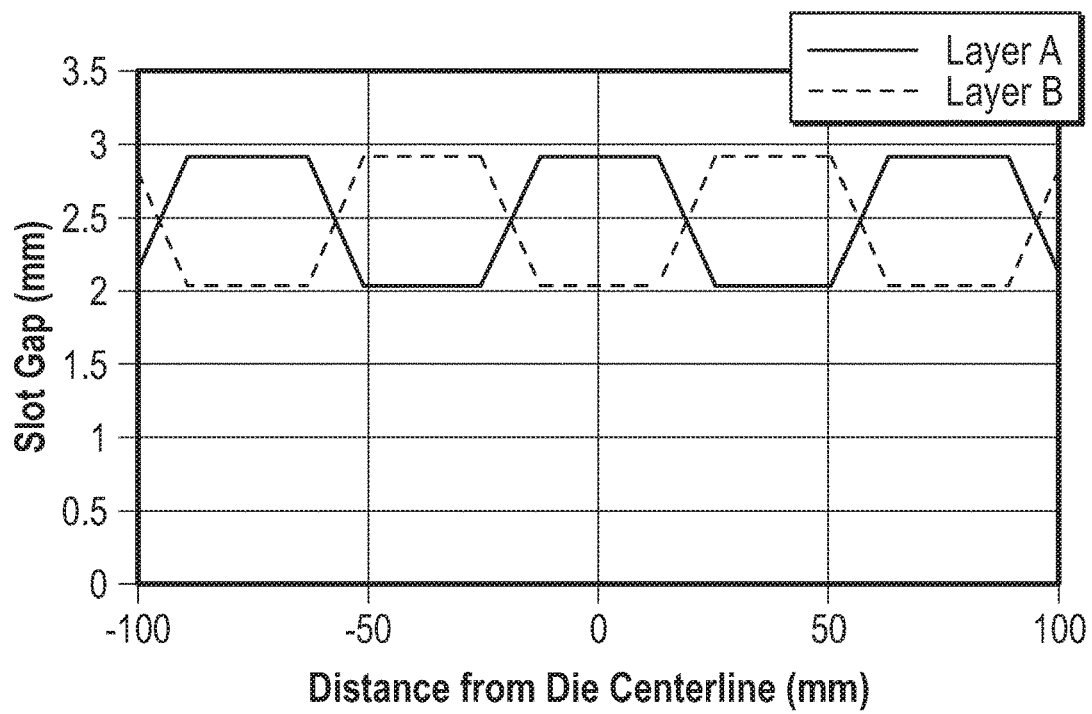

A die tip was inserted in an 8″ (203.2 mm) wide, 2 manifold die with replaceable internal point of confluence, where the Layer A channel had a 0.115 inch (2.92 mm) gap over the center 1.0 inch (25.4 mm) of the tip, linearly tapered down to 0.080 inch (2.032 mm) over the 0.5 inch (12.7 mm) on each side of the center section. The gap remained at 0.080 inch (2.032 mm) for 1.0 inch (25.4 mm) and then increased back to 0.115 inch (2.92 mm) over the next 0.5 inch (12.7 mm). This pattern repeated for 3 "waves" on the Layer A channel. The Layer B has an 0.080 inch (2.032 mm) gap over the center 1.0 inch (25.4 mm) of the tip then increasing to 0.115 inch (2.92 mm) over 0.5 inch (12.7 mm) on each side of center. The Layer B channel continues as an inverse of the Layer A channel. This profile was calculated to produce an internal interface with the thickest portions three times thicker than the thinnest portions. The die is shown in FIG. 8(a), and the profile of the slot gap of the die shown in FIG. 8(b).

Aliphatic polyether-based thermoplastic Polyurethane (KRYSTALGRAN PE102-200, Huntsman, Salt Lake City Utah, USA) was fed into an extruder at a rate of 10 lbs/hr, which in turn fed the Layer A channel of the previously described die. A 69.994/30/0.006 mix of homopolymer polypropylene (3857, Total Petrochemicals, Houston Tex.), ethylene propylene copolymer (PRO-FAX SR549M, LyondellBasill Industries, Houston Tex. USA), and Ceres Blue 3R dye (LANXESS AG, Cologne, Germany) and was fed into an extruder at a rate of 10 lbs/hr (4.54 kg/hr), which was in turn fed into the Layer B channel of the previously described die. These materials are all coextrudable with each other and are all melt processable at a temperature of 154 degrees C. (310 degrees F.) or greater. The extruders and die were heated to temperatures of 204 to 215 degrees C. (400 to 420 degrees F.) during the extrusion of this film sample.

The resulting multilayered coextrusion flowed from the die, and was cast onto a chilled casting wheel held at 49 degrees C. (120 degrees F.) with electrostatic pinning, turning at 5 fpm (1.52 meters per minute), which produced the multilayered polymer film.

Figure 9:
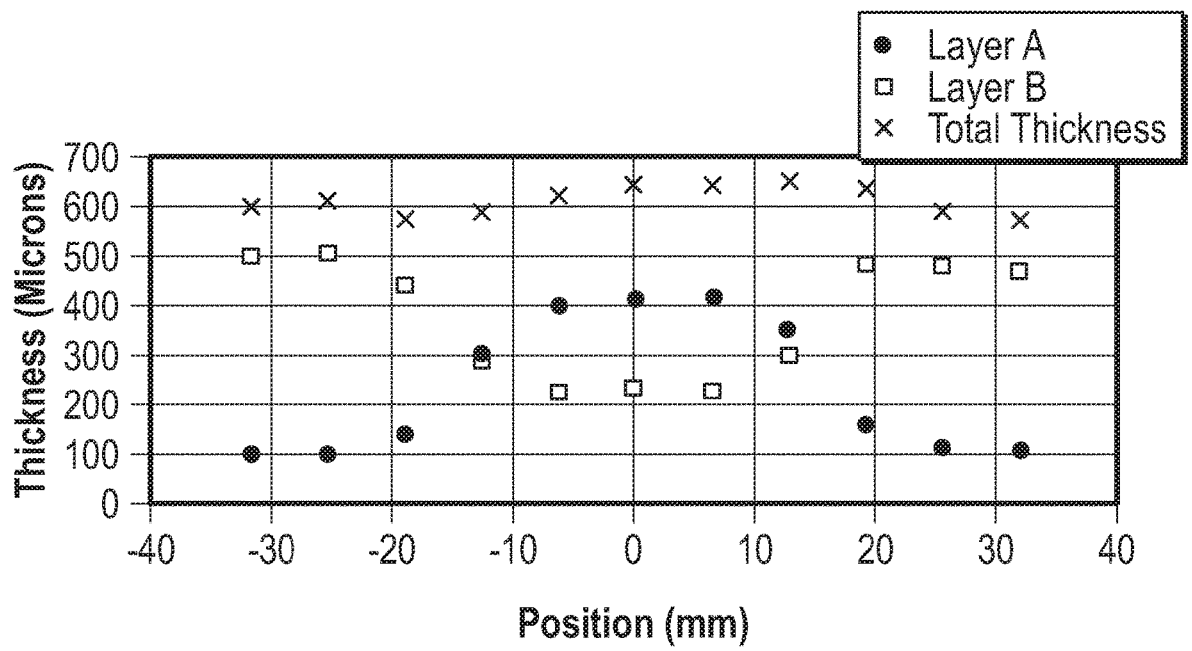
FIG. 9 shows a thickness profile of an exemplary embodiment of the present disclosure.

The edges of the multilayered laminate were slit with a razor blade to remove the edge effects from the sample, to create a multilayered laminate that was 5.5 inches (139.7 mm) wide. The sample was cross sectioned, and the thickness of the urethane Layer A and polypropylene Layer B were measured with a Nikon LV100NDA microscope running NIS-Elements software. The thickness was measured every 0.25 inches (6.35 mm) across the sample. The thickness results are shown in Table 3 and FIG. 9.

TABLE 3

Thickness of Layers A and B and total film thickness for Example 4.

| Cross Web Position (mm) | Layer A Thickness (microns) | Layer B Thickness (microns) | Total Caliper (sum of Layer A and Layer B, microns) |
|---|---|---|---|
| −31.75 | 101 | 502 | 603 |
| −25.4 | 104 | 508 | 612 |
| −19.05 | 138 | 443 | 581 |
| −12.7 | 302 | 289 | 591 |
| −6.35 | 400 | 225 | 625 |
| 0 | 416 | 232 | 648 |
| 6.35 | 417 | 229 | 646 |
| 12.7 | 351 | 303 | 654 |
| 19.05 | 157 | 486 | 643 |
| 25.4 | 110 | 482 | 592 |
| 31.75 | 105 | 472 | 577 |

Example 5

A beaded masterbatch was created by adding 4 microns polystyrene beads (SBX-4 beads from Sekisui Plastics, Osaka, JP) via a compounded masterbatch of polystyrene beads in PETg (EASTAR Copolyester GN071 from Eastman Chemical, Kingsport, Tenn., USA). The beaded masterbatch, comprising SBX-4 and GN071, was compounded at approximately 68% by volume of SBX-4 beads.

A multilayered polymer film was substantially the same, and made in the same way, as the multilayered polymer film described in Example 1, except that the extruder feeding the Layer B channel was fed with a 11.994/65/0.006/23 mix of homopolymer polypropylene (3857, Total Petrochemicals, Houston Tex.), ethylene propylene copolymer (PRO-FAX SR549M, Lyondell Basell Industries, Houston Tex. USA), Ceres Blue 3R dye (LANXESS AG, Cologne, Germany) and the beaded masterbatch described previously. This gave an approximate bead loading, in the Layer B, of approximately 16% w/w beads.

When the Layer B was separated from the Layer A, the beads imparted a surface texture onto the Layer A.

Figure 10:
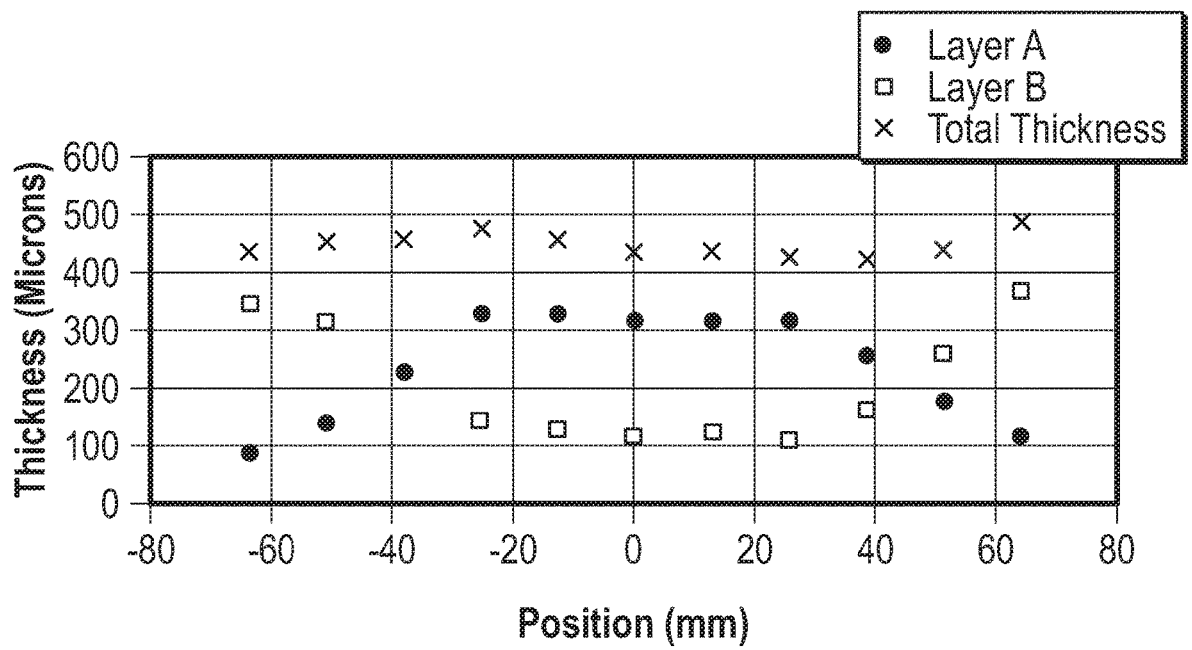
FIG. 10 shows a thickness profile of an exemplary embodiment of the present disclosure.

The edges of the multilayered laminate were slit with a razor blade to remove the edge effects from the sample, to create a multilayered laminate that was 5 inches (127 mm) wide. The sample was cross sectioned, and the thickness of the urethane Layer A and polypropylene Layer B were measured with a Nikon LV100NDA microscope running NIS-Elements software. The thickness was measured every 0.5 inches (12.7 mm) across the sample. The thickness results are shown in Table 4 and FIG. 10.

TABLE 4

Thicknesses of Layers A and B and total film thickness for Example 5.

| Cross Web Position (mm) | Layer A Thickness (microns) | Layer B Thickness (microns) | Total Caliper (sum of Layer A and Layer B, microns) |
|---|---|---|---|
| −63.5 | 91 | 348 | 439 |
| −50.8 | 141 | 317 | 458 |
| −38.1 | 231 | 231 | 462 |

TABLE 4-continued

Thicknesses of Layers A and B and
total film thickness for Example 5.

| Cross Web Position (mm) | Layer A Thickness (microns) | Layer B Thickness (microns) | Total Caliper (sum of Layer A and Layer B, microns) |
|---|---|---|---|
| −25.4 | 333 | 147 | 480 |
| −12.7 | 332 | 129 | 461 |
| 0 | 320 | 120 | 440 |
| 12.7 | 319 | 123 | 442 |
| 25.4 | 320 | 112 | 432 |
| 38.1 | 259 | 167 | 426 |
| 50.8 | 181 | 264 | 445 |
| 63.5 | 119 | 371 | 490 |

Example 6

A multilayered polymer film was substantially the same, and made in the same way, as the multilayered polymer film described in Example 5, except that the extruder feeding the Layer B channel was fed with a 21/8.994/0.006/70 mix of ethylene propylene copolymer (PRO-FAX SR549M, LyondellBasill Industries, Houston Tex. USA), Ceres Blue 3R dye (LANXESS AG, Cologne Ger.) and KRATON G1657 M polymer (Kraton Corp, Houston Tex. USA).

Figure 11:
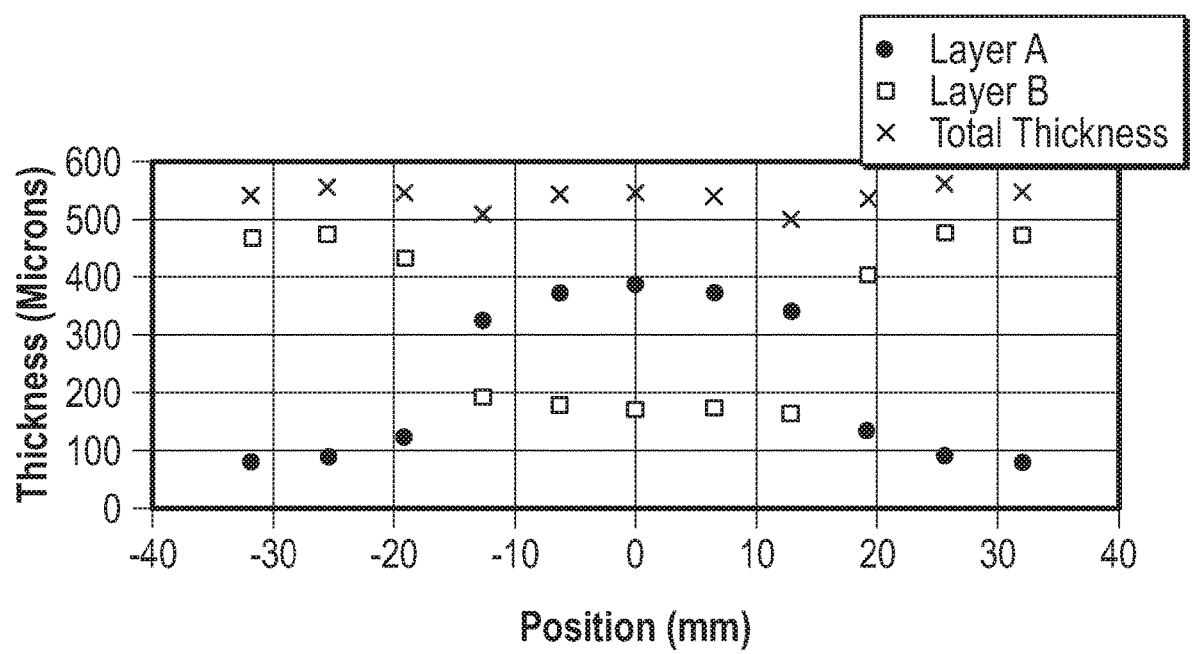
FIG. 11 shows a thickness profile of an exemplary embodiment of the present disclosure.

The edges of the multilayered laminate were slit with a razor blade to remove the edge effects from the sample, to create a multilayered laminate that was 2.5 inches (63.5 mm) wide. The sample The multilayered laminate was cross sectioned, and the thickness of the urethane Layer A and polypropylene Layer B were measured with a Nikon LV100NDA microscope running NIS-Elements software. The thickness was measured every 0.25 inches (6.35 mm) across the sample. The thickness results are shown in Table 5 and FIG. 11.

TABLE 5

Thicknesses of Layers A and B and total film
thickness for Example 6.

| Cross Web Position (in.) | Layer A Thickness (microns) | Layer B Thickness (microns) | Total Caliper (sum of Layer A and Layer B, microns) |
|---|---|---|---|
| −31.75 | 77 | 467 | 544 |
| −25.4 | 85 | 472 | 557 |
| −19.05 | 116 | 433 | 549 |
| −12.7 | 321 | 190 | 511 |
| −6.35 | 372 | 174 | 546 |
| 0 | 386 | 165 | 551 |
| 6.35 | 372 | 171 | 543 |
| 12.7 | 340 | 161 | 501 |
| 19.05 | 133 | 403 | 536 |
| 25.4 | 86 | 479 | 565 |
| 31.75 | 77 | 474 | 551 |

Example 7 (Prophetic)

A multilayered polymer film is substantially the same, and made in the same way, as the multilayered polymer film described in Example 1, except that Layer A is fed with a bilayer stream consisting of a top layer of aliphatic polyether-based thermoplastic polyurethane (KRYSTALGRAN PE102-200, Huntsman, Salt Lake City Utah, USA) mixed with 1% TiO2 to color it white, and a bottom layer of aliphatic polyether-based thermoplastic Polyurethane (KRYSTALGRAN PE102-200, Huntsman, Salt Lake City Utah, USA) mixed with 1% red dye to color it red.

Although specific embodiments have been illustrated and described herein for purposes of description of some embodiments, it will be appreciated by those of ordinary skill in the art that a wide variety of alternate and/or equivalent implementations may be substituted for the specific embodiments shown and described without departing from the scope of the present disclosure.

We claim:

1. A film comprising a coextruded stack, wherein the coextruded stack comprises:
   a layer A having a first major surface and a second major surface opposite the first major surface;
   wherein a cross-section profile of the first major surface of the layer A is substantially flat and a cross-section profile of the second major surface of the layer A is non-flat,
   a layer B having a first major surface and a second major surface opposite the first major surface, wherein layer B is selected from the group consisting of from low density polyethylene (LDPE), linear low density polyethylene (LLDPE), homopolymer propylene, ethylene-propylene copolymer, styrene-butadiene-styrene block copolymer (SBS), styrene-ethylene/butylene-styrene block copolymer (SEBS), styrene-ethylene/propylene-styrene (SEPS) block copolymer, and combinations thereof;
   wherein the first major surface of the layer B is immediately adjacent to the second major surface of the layer A,
   wherein a cross-section profile of the second major surface of the layer B is substantially flat,
   wherein the cross-section profile of the first major surface of the layer B is the inverse of the cross-section profile of the second major surface of the layer A,
   wherein the cross-section profile of the second major surface of the layer A has an inner section between a first edge lateral section and a second edge lateral section,
   wherein a maximum thickness of the inner section is Ti, a thickness of the first edge lateral section is T1, and a thickness of the second edge lateral section is T2,
   wherein Ti is greater than each of T1 and T2,
   wherein a ratio Ti/T1 is at least 2:1 and
   wherein the coextruded film has a releasable interface between the layer A and the layer B,
   wherein the layer A comprises a thermoplastic elastomer chosen from thermoplastic polyurethane, aliphatic polyether-based thermoplastic polyurethane, crosslinked polyurethanes, polyureas, and combinations thereof, wherein the thermoplastic elastomer is a principal constituent of the layer A, and
   wherein the coextruded film has a width of at least 50 mm to about 1500 mm.

2. A film according to claim 1, wherein the film further comprises an adhesive layer adjacent the first major surface of the layer A, and a liner adjacent the adhesive layer opposite the first major surface of the layer A.

3. A film according to claim 1, wherein Ti ranges from 100 microns to 500 microns, and wherein T1 and T2, independently from each other, range from 2 microns to 200 microns.

4. A film according to claim 1, wherein Ti ranges from 100 microns to 350 microns, and wherein T1 and T2, independently from each other, range from 5 microns to 150 microns.

5. A film according to claim 1, wherein the interface between the layer A and the layer B is roughened.

6. A film according to claim 1, wherein the interface between the layer A and the layer B is structured with a regular pattern.

7. A film according to claim 1, wherein the interface between the layer A and the layer B is structured with a stochastic pattern.

8. A film according to claim 1, wherein layer A comprises one or more thermoplastic elastomers having an average molecular weight ranging from 20,000 g/mole to 2 million g/mole.

9. A film according to claim 1, wherein the layer A is a multilayer film, wherein the modulus of elasticity of each layer in the multilayer film is chosen independently from the modulus of elasticity of the other layers.

\* \* \* \* \*

UNITED STATES PATENT AND TRADEMARK OFFICE
CERTIFICATE OF CORRECTION

PATENT NO. : 11,597,183 B2
APPLICATION NO. : 16/608407
DATED : March 7, 2023
INVENTOR(S) : Michael Benton Free et al.

It is certified that error appears in the above-identified patent and that said Letters Patent is hereby corrected as shown below:

In the Claims

Column 40,
Line 37, delete "the cross-section profile" and insert -- a cross-section profile --, therefor.

Signed and Sealed this
Third Day of September, 2024

Katherine Kelly Vidal
*Director of the United States Patent and Trademark Office*